US 6,671,680 B1

(12) United States Patent
Iwamoto et al.

(10) Patent No.: US 6,671,680 B1
(45) Date of Patent: Dec. 30, 2003

(54) DATA MINING APPARATUS AND STORAGE MEDIUM STORING THEREIN DATA MINING PROCESSING PROGRAM

(75) Inventors: Masaki Iwamoto, Kawasaki (JP); Masato Honda, Kawasaki (JP); Koichi Tsuzuki, Kawasaki (JP); Toshihiko Fushimi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 09/717,132

(22) Filed: Nov. 22, 2000

(30) Foreign Application Priority Data

Jan. 28, 2000 (JP) .......................... 2000-019565

(51) Int. Cl.[7] ..................... G06F 17/30; G06F 7/00
(52) U.S. Cl. ..................... 707/3; 707/1; 707/4; 707/5
(58) Field of Search ................... 707/1–10, 100–104.1

(56) References Cited

U.S. PATENT DOCUMENTS

| | | | | |
|---|---|---|---|---|
| 5,329,596 | A | * 7/1994 | Sakou et al. | 382/226 |
| 5,727,199 | A | * 3/1998 | Chen et al. | 707/6 |
| 5,764,975 | A | * 6/1998 | Taniguchi et al. | 707/6 |
| 6,212,526 | B1 | * 4/2001 | Chaudhuri et al. | 707/102 |
| 6,272,478 | B1 | * 8/2001 | Obata et al. | 706/12 |
| 6,415,287 | B1 | * 7/2002 | Wang et al. | 707/6 |
| 6,446,061 | B1 | * 9/2002 | Doerre et al. | 707/3 |
| 6,477,538 | B2 | * 11/2002 | Yaginuma et al. | 707/102 |

FOREIGN PATENT DOCUMENTS

JP  11-15897  1/1999

* cited by examiner

*Primary Examiner*—Greta Robinson
*Assistant Examiner*—Linh Black
(74) *Attorney, Agent, or Firm*—Staas & Halsey LLP

(57) ABSTRACT

According to a display processing unit, dividing axes are arranged and the division number and a connection between classification results are simultaneously displayed by a polygonal line onto a parallel coordinate graph obtained as a polygonal line by plotting a classification result of every plural analysis items by a clustering processing unit onto an axis of each analysis item. An annual ring diagram showing a division number which is more proper as an annual ring is thicker is displayed. The display processing unit displays a tree diagram obtained as a processing result of a classification processing unit by a folding, sorting, or the like so as to be easily understood. An output processing unit converts an unknown rule discovered by the classification into a format which can be used in an external application and outputs it.

26 Claims, 31 Drawing Sheets

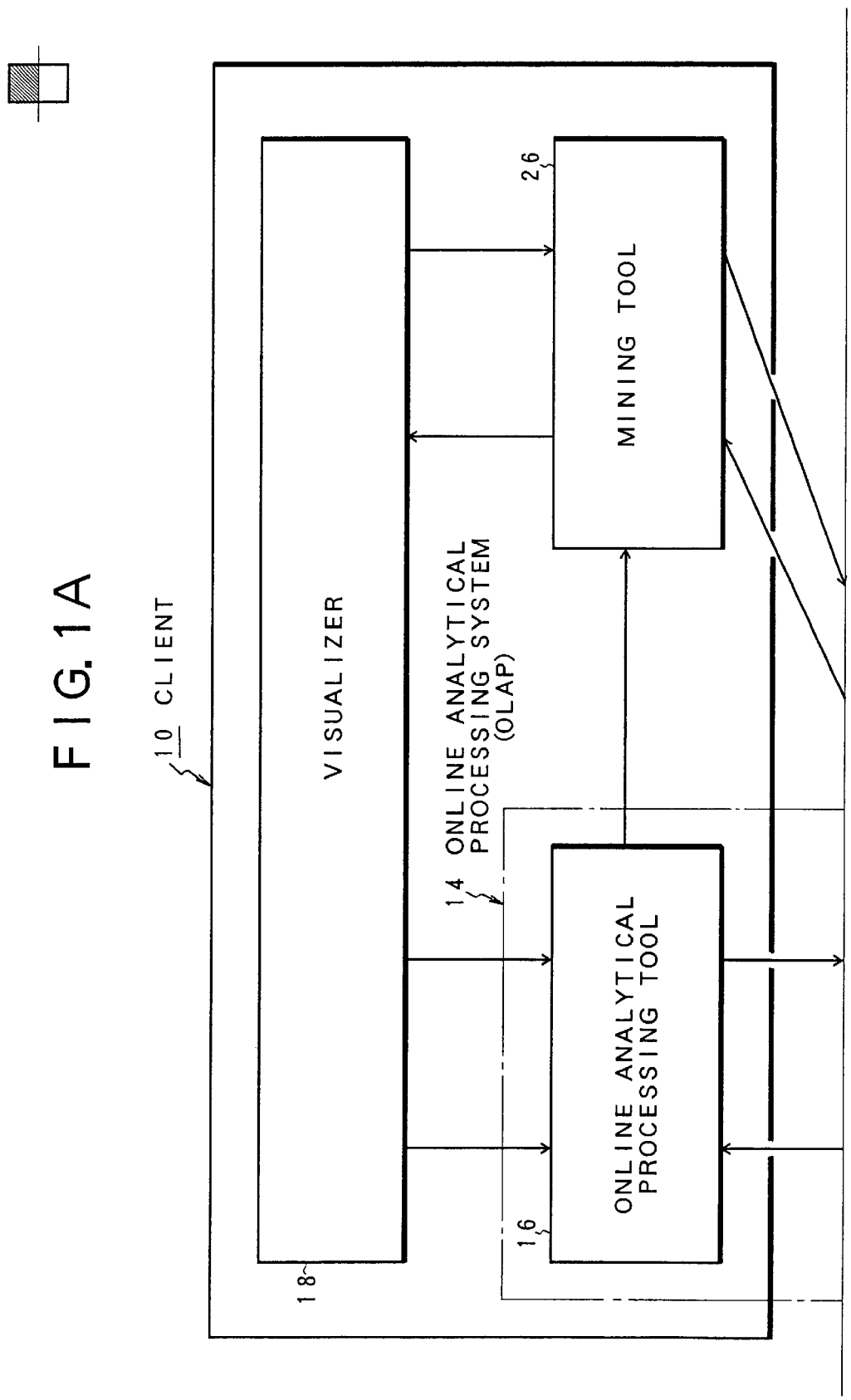

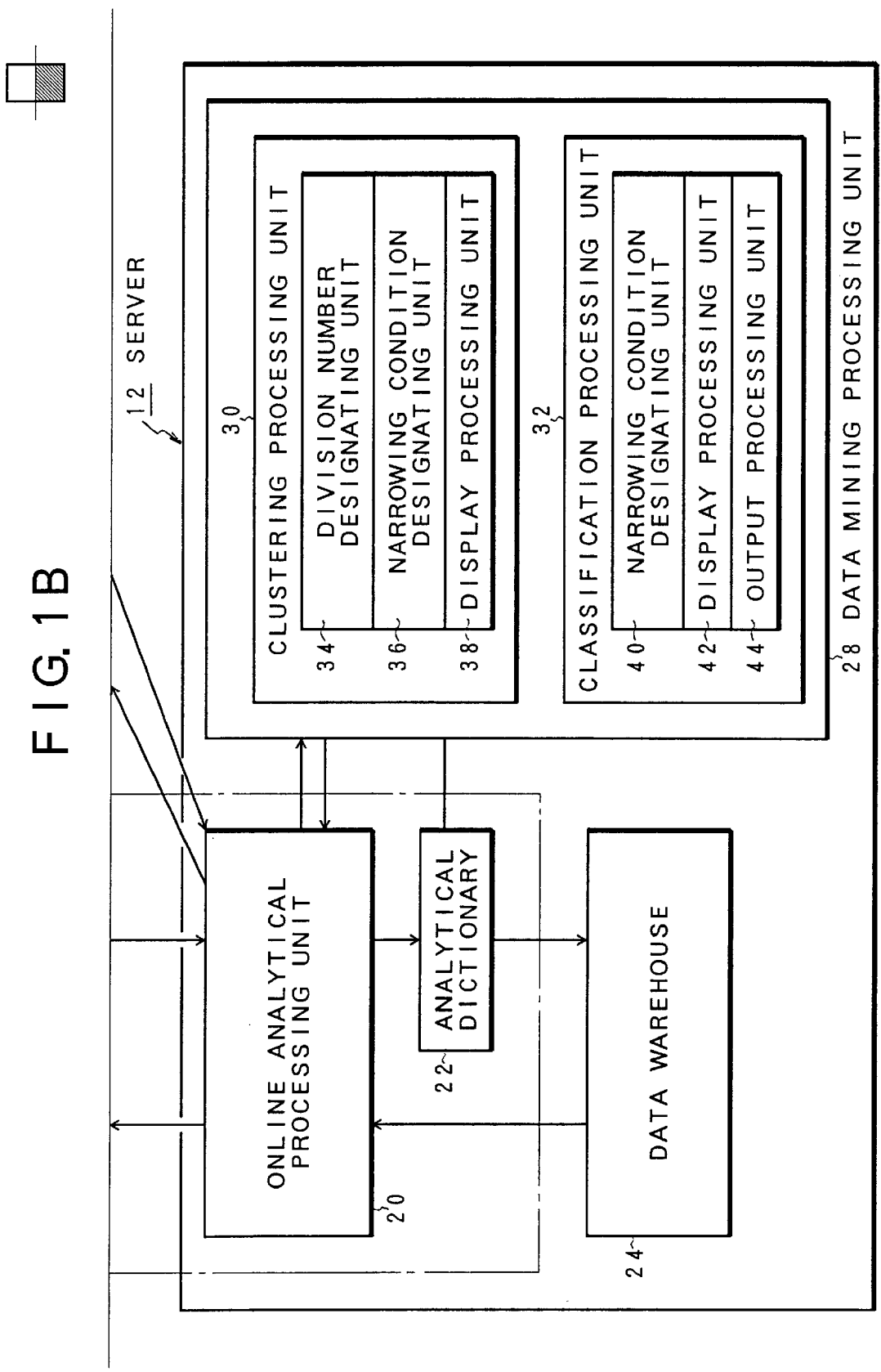

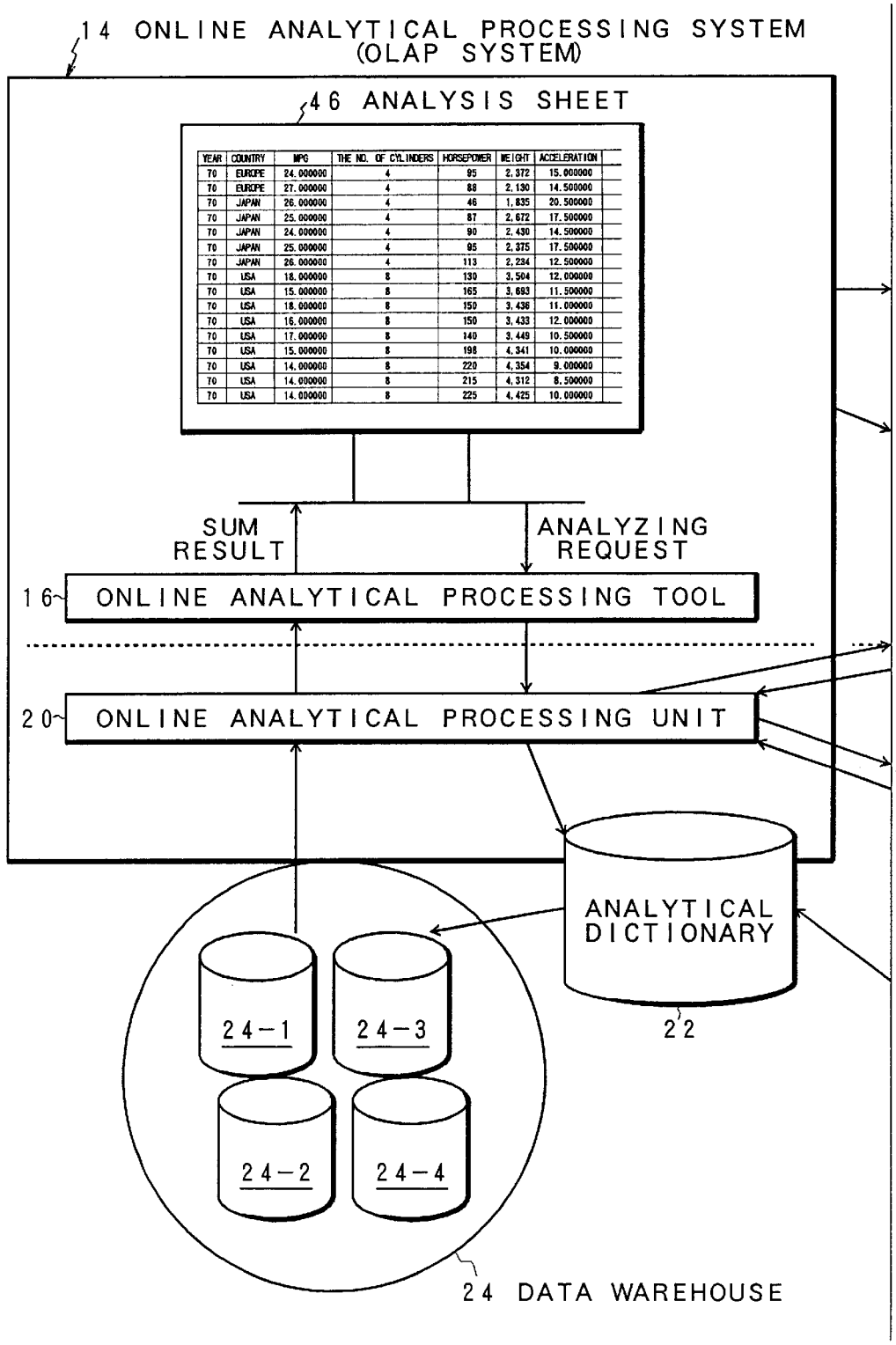

FIG. 3

46 ANALYSIS SHEET

| YEAR | COUNTRY | MPG | THE NO. OF CYLINDERS | HORSEPOWER | WEIGHT | ACCELERATION |
|---|---|---|---|---|---|---|
| 70 | EUROPE | 24.0000000 | 4 | 95 | 2,372 | 15.000000 |
| 70 | EUROPE | 27.0000000 | 4 | 88 | 2,130 | 14.500000 |
| 70 | JAPAN | 26.0000000 | 4 | 46 | 1,835 | 20.500000 |
| 70 | JAPAN | 25.0000000 | 4 | 87 | 2,672 | 17.500000 |
| 70 | JAPAN | 24.0000000 | 4 | 90 | 2,430 | 14.500000 |
| 70 | JAPAN | 25.0000000 | 4 | 95 | 2,375 | 17.500000 |
| 70 | JAPAN | 26.0000000 | 4 | 113 | 2,234 | 12.500000 |
| 70 | USA | 18.0000000 | 8 | 130 | 3,504 | 12.000000 |
| 70 | USA | 15.0000000 | 8 | 165 | 3,693 | 11.500000 |
| 70 | USA | 18.0000000 | 8 | 150 | 3,436 | 11.000000 |
| 70 | USA | 16.0000000 | 8 | 150 | 3,433 | 12.000000 |
| 70 | USA | 17.0000000 | 8 | 140 | 3,449 | 10.500000 |
| 70 | USA | 15.0000000 | 8 | 198 | 4,341 | 10.000000 |
| 70 | USA | 14.0000000 | 8 | 220 | 4,354 | 9.000000 |
| 70 | USA | 14.0000000 | 8 | 215 | 4,312 | 8.500000 |
| 70 | USA | 14.0000000 | 8 | 225 | 4,425 | 10.000000 |

2-DIVISION

3-DIVISION

4-DIVISION

5-DIVISION

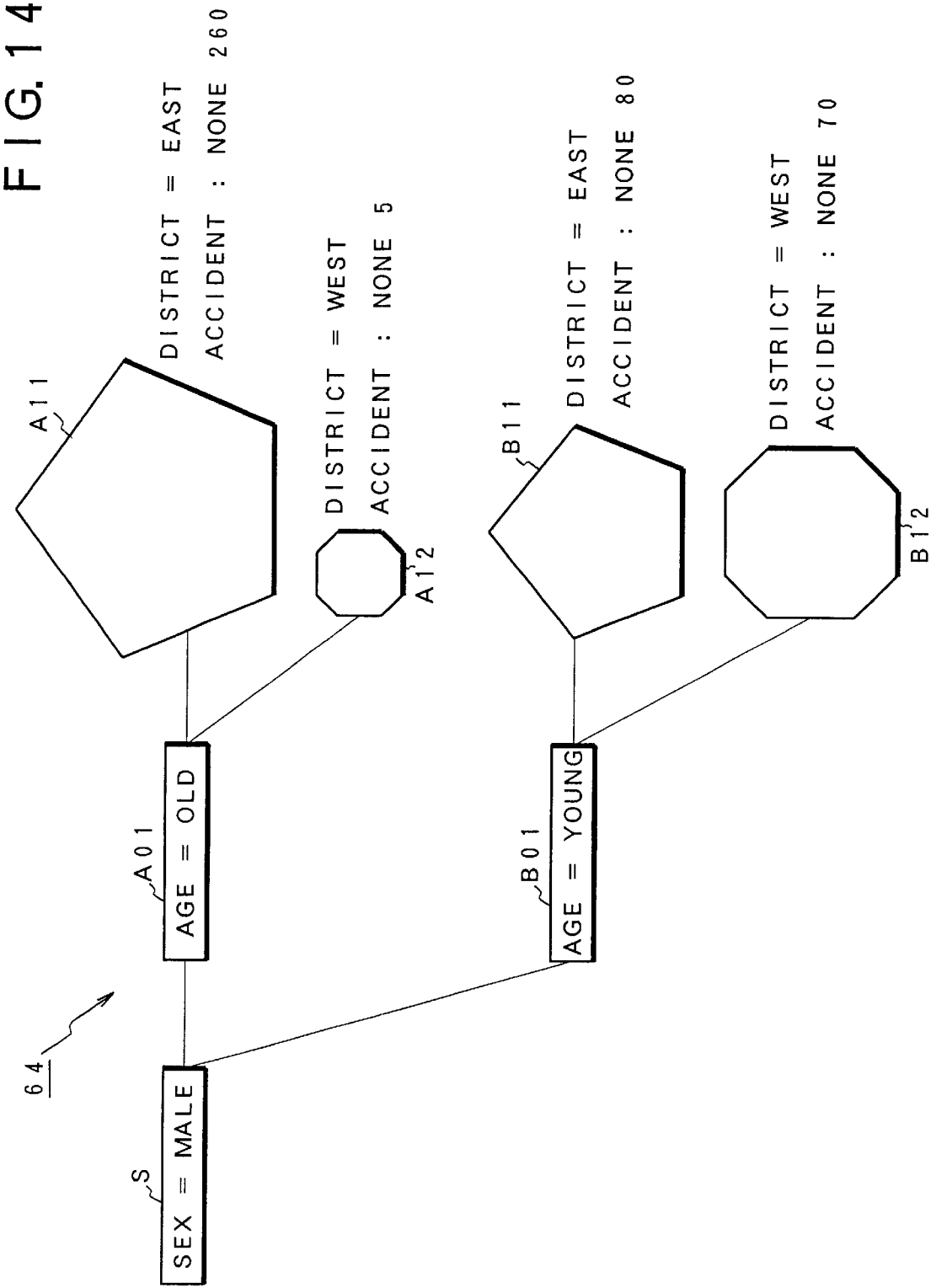

IF MPG > 13.5 HORSEPOWER ≦ 227.5 AND ACCELERATION ≦ 11.05 THEN YEAR = 70

IF 11.5 < MPG ≦ 13.5 HORSEPOWER ≦ 124.5 AND 3709 < WEIGHT ≦ 4057.5 AND 11.45 < ACCELERATION ≦ 17.75
THEN YEAR = 76

| CONDITION NAME | CONDITIONAL EXPRESSIONS |
|---|---|
| YEAR = 70 | X1.MPG > 13.5 AND X1.BARI ≦ 227.5 AND X1.KASOKU ≦ 11.05 |
| YEAR = 76 | 11.5 < X1.MPG ≦ 13.5 X1.BARI > 124.5 AND 3709 < X1.JURYO ≦ 4057.5 AND 11.45 < X1.KASOKU ≦ 17.75 |

F I G. 2 0 C
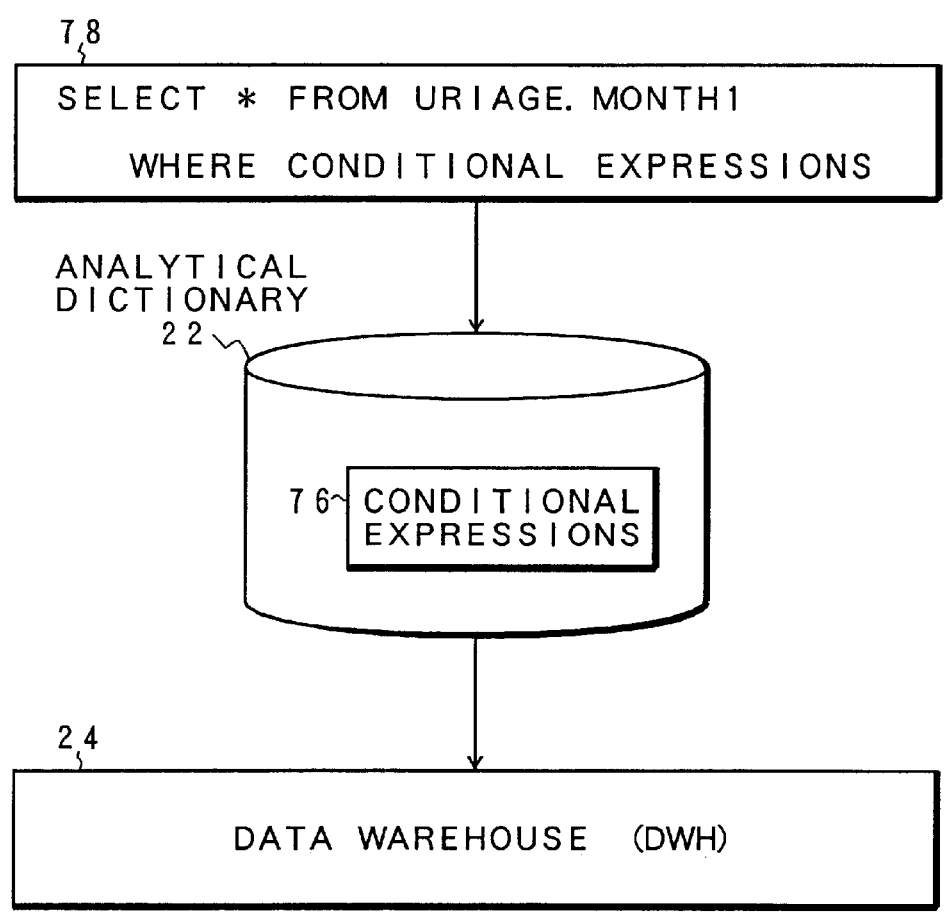

FIG. 23A

| | A | | C | | | F | G |
|---|---|---|---|---|---|---|---|
| | MPG | THE NO. OF CYLINDERS | HORS | VISUAL MINING (V) | | YEAR | COUNTRY |
| | | | | NARROW BY PATTERN 1 (W) | | | |
| 2 | 18 | 8 | 130 | 3504 | 12 | 70 | USA |
| 3 | 15 | 8 | 165 | 3693 | 11.5 | 70 | USA |
| 4 | 18 | 8 | 150 | 3436 | 11 | 70 | USA |
| 5 | 16 | 8 | 150 | 3433 | 12 | 70 | USA |
| 6 | 17 | 8 | 140 | 3449 | 10.5 | 70 | USA |
| 7 | 15 | 8 | 198 | 4341 | 10 | 70 | USA |
| 8 | 14 | 8 | 220 | 4354 | 9 | 70 | USA |
| 9 | 14 | 8 | 215 | 4312 | 8.5 | 70 | USA |
| 10 | 14 | 8 | 225 | 4425 | 10 | 70 | USA |
| 11 | 15 | 8 | 190 | 3850 | 8.5 | 70 | USA |
| 12 | 15 | 8 | 170 | 3563 | 10 | 70 | USA |
| 13 | 14 | 8 | 160 | 3609 | 8 | 70 | USA |
| 14 | 15 | 8 | 150 | 3761 | 9.5 | 70 | USA |
| 15 | 14 | 8 | 225 | 3086 | 10 | 70 | USA |
| 16 | 24 | 4 | 95 | 2372 | 15 | 70 | EUROPE |

| | A | B | C | D | E | F | G | H |
|---|---|---|---|---|---|---|---|---|
| 1 | MPG | THE NO. OF CYLINDERS | HORSEPOWER | WEIGHT | ACCELERATION | YEAR | | |
| 2 | 33.8 | 4 | 67 | 2145 | 18 | 80 | | |
| 3 | 34 | 4 | 88 | 2395 | 18 | 82 | | |
| 4 | 34.2 | 4 | 70 | 2200 | 13.2 | 79 | | |
| 5 | 36 | 4 | 75 | 2205 | 14.5 | 82 | | |
| 6 | 36.4 | 5 | 67 | 2950 | 19.9 | 80 | | |
| 7 | 37 | 4 | 92 | 2434 | 15 | 80 | | |
| 8 | 37.7 | 4 | 62 | 2050 | 17.3 | 81 | | |
| 9 | 38.1 | 4 | 60 | 1968 | 18.8 | 80 | | |
| 10 | 41.5 | 4 | 76 | 2144 | 14.7 | 80 | | |
| 11 | 43.1 | 4 | 48 | 1985 | 21.5 | 78 | | |
| 12 | | | | | | | | |
| 13 | | | | | | | | |
| 14 | | | | | | | | |
| 15 | | | | | | | | |
| 16 | | | | | | | | |

84

DATA MINING APPARATUS AND STORAGE MEDIUM STORING THEREIN DATA MINING PROCESSING PROGRAM

BACKGROUND OF THE INVENTION

1. Field of the Invention

The present invention relates to a data mining apparatus for discovering an unknown rule hidden in data by a mathematical method such as clustering or classification and to a storage medium in which a data mining processing program has been stored. More particularly, the invention relates to a data mining apparatus for displaying an unknown rule discovered by data mining so that the user can easily understand it and for enabling the unknown rule to be externally utilized and to a storage medium in which a data mining processing program has been stored.

2. Description of the Related Arts

In recent years, attention has been paid to data mining for automatically discovering an unknown rule from a large amount of data of Giga bytes or Tera bytes accumulated for a long time till now by a mathematical method. The data mining has: a "discovery-like approach" to classify and refine information on the basis of a certain hidden rule, thereby automatically finding out information which cannot be manually found; and a "verificative approach" to analyze uncertain known information and add certainty to the information.

Hitherto, according to the data mining, an engine having an application interface is called and a result is reported. With respect to it, there are various methods of reporting the result. A display format with high visibility for each analyzing algorithm has not been established yet. Accordingly, although the data mining has high intelligent engine function and performance, the data mining is not introduced in general systems very often.

The data mining includes: clustering for classifying data having similar characteristics into clusters (classes) and extracting an unknown rule; and classification for extracting an unknown rule by expressing characteristics of a specific analysis item by a function or a profile using the other analysis items as condition values with respect to a group of data having a plurality of analysis items as targets. The clustering automatically collects similar data into the same group by using a conventional algorithm called a Word method or the like. In this case, the data can be divided into any number of groups in accordance with the designation of the user. In JP-A-11-15897, the results obtained by designating a certain division number and clustering data are plotted to axes of a plurality of analysis items of a parallel coordinate graph and a polygonal line of each record is overlapped thereto, thereby displaying. Although the clustering divides the data on the basis of the designated division number into groups, the optimum division number cannot be found soon even when the clustering result is expressed on the parallel coordinate graph. In order to obtain the optimum division number, the user pays attention to the axes of a plurality of analysis items, analyzes a tendency of the data, and judges which division number is the best, so that he finally knows the proper division number. However, when the division number is large or a range of division is wide, an extreme troublesomeness is caused to decide the proper division number.

On the other hand, the classification generally uses a decision tree or a recurrence tree. In many cases, a rule extracted by using the algorithm of the decision tree or recurrence tree is visualized in a format of a tree diagram which branches on the basis of condition values which are automatically formed.

However, the tree diagram for expressing the result of the classification tends to display a complicated multilayer in which a root is set as a start point, the tree diagram branches at multi-stage nodes, and each branch finally reaches a leaf. It is difficult to grasp a rule having significance from such a tree diagram. Information expressed in the tree diagram obtained as a result of the classification is merely formed as drawing information and used to discover a rule having significance from it by the user.

SUMMARY OF THE INVENTION

According to the invention, there is provided a data mining apparatus for improving a display of a rule discovered by data mining, thereby enabling the user to easily understand it and easily discover a rule having significance.

According to the invention, there is provided a data mining apparatus in which a rule discovered by data mining can be used by an external application.

According to the invention, there is provided a data mining apparatus for discovering an unknown rule included in a data group, comprising a clustering processing unit and a classification processing unit which function as a data mining engine.

1. Clustering

According to the invention, first, the clustering process has the following features.

(Simultaneous Display of the Classification Result and the Division Number)

The data mining apparatus of the invention comprises: a division number designating unit for designating a division range of 2-division to an arbitrary division number N; a clustering processing unit for classifying data having similar characteristics into a plurality of clusters (classes) every division number within a range of 2-division to the designated division number N with respect to a group of data having a plurality of analysis items as targets; and a display processing unit for simultaneously displaying a plurality of processing results obtained by the clustering processing unit.

Particularly, the display processing unit displays a parallel coordinate graph as a polygonal line by plotting the classification result of the designated division number N onto an axis of each analysis item and arranges the dividing axes of 2-division to the designated division number N, for example, N=5-division, thereby simultaneously displaying a transition of the division and a connection between the classification results by a polygonal line. In this manner, by simultaneously arranging and displaying the transition of the division based on the display of the dividing axes of 2-division to the designated division number of, for example, 5-division and the clustering results at the designated division number, it is necessary to again analyze the reason why the data has been classified into the specific group among the divided groups from another viewpoint, thereby enabling the proper division number to be easily determined. In other words, by simultaneously comparing a plurality of analysis items, which grouping is the best can be known when customer information or the like is grouped. The clustering can be used in a specific business field.

(Annual Ring Display of the Classification Results and the Division Numbers)

The display processing unit converts the classification result of each of the division numbers from 2-division to the designated division number N into an annual ring diagram and displays it. The annual ring diagram expresses the division numbers in the increasing order from the inner annual ring toward the outer annual ring and expresses a data distance between the clusters divided into widths (thicknesses) in the radial direction of the annual ring, thereby allowing the division number of the annual ring having the largest width to be recognized as a proper division number. The clustering is characterized in that a large amount of data is divided into groups having similar tendencies by a unique algorithm, and the user designates the division number upon dividing. The user also judges whether the designated division number is proper or not. According to the annual ring diagram of the present invention, the proper division number can be presented to the user by displaying the significance of the division every division number. Consequently, the grouping based on a plurality of analysis items such as customer information and the like can be significantly performed.

2. Classification

The invention has the following characteristics as a classification.

(Folding of the Node)

The data mining apparatus of the invention comprises: a classification processing unit for forming characteristics of a specific analysis item among a plurality of analysis items by predicting an unknown rule in which the other analysis items as condition values with respect to a data group having a plurality of analysis items as targets; and a display processing unit for, when a result of formation of the classification processing unit is expressed and displayed as a tree diagram, converting it into a tree diagram in which nodes having no significance are not displayed and displaying the tree diagram. The plurality of analysis items processed by each data group are called attributes or segments of data. For example, in case of the attributes, classification can be mentioned as a method of forming a function or a profile for predicting a specific attribute from values of other attribute groups. In the tree diagram which is formed as classification by the algorithm of the decision tree, significance of the nodes and leaves is shown as information by branch trimming which is mechanically performed on the basis of a confidence degree. However, when information of various analysis items is classified by the decision tree, the numbers of nodes and leaves is enormously large, so that it is impossible to discover important information by the eyes. In this instance, according to the invention, unnecessary branching conditions in the tree diagram are not displayed and the relation between the nodes and the leaves is displayed simply. Consequently, with respect to certain itemized information whose characteristics are desired to be known, it is possible to easily grasp by which kind of rule using the other analysis items as conditions such information has been classified. It is possible to support the operation for grasping customer characteristics in customer information or the like.

(Narrowing Conditions)

There is provided a narrowing condition designating unit for narrowing down a range of data which is processed in the classification processing unit of the invention by the designation of the user. The narrowing condition designating unit narrows down a range of the number of layers in the classification, a range of the number of records, a range of each item value, and the like by the user designation. As data to be subjected to the data mining, there is a large amount of data of giga bytes or tera bytes. When all data is used, it takes a very long time to analyze data and display the result. According to the invention, since the range of data which is handled in the mining can be designated, a large amount of data is narrowed down and the mining analysis can be performed in a short time. Since only the data corresponding to the necessary conditions can be extracted from the mining result, a rule having significance can be easily extracted. The user designation for the narrowing conditions is also applied to the clustering. In the clustering, the narrowing condition designating unit narrows down the range of the number of records, range of the item values, or the like on the basis of the user designation.

(Improvement of the Tree Diagram)

When the formation result of the unknown rule extracted from the data by the classification processing unit is expressed by a tree diagram and displayed, the display processing unit gives changes based on a plurality of attributes to the shapes, colors, and/or sizes of the nodes and leaves. The display processing unit changes the shapes, colors, and/or sizes expressing the nodes and leaves of the tree diagram by using, for example, the number of records and the confidence degree as attributes. In many cases, the rule which is formed as a decision tree and numerical information such as the number of records, confidence degree, and the like are fundamentally exhibited as character information in the tree diagram. According to the invention, by expressing the numerical information by the shapes, colors, and the like of the nodes and leaves of a branch node, the tendency of the data can be more intuitively grasped.

(Sorting of the Tree Diagram)

When the formation result of the unknown rule extracted from the data by the classification processing unit is expressed by a tree diagram and displayed, the display processing unit evaluates the significance of the nodes and leaves and sorts the tree diagram on the basis of the significance. In this manner, the significance of each of the nodes and leaves is evaluated on the basis of the number of records or the confidence degree, the tree diagram is sorted in the ascending or descending order of significance, and the tree diagram is expressed so as to be easily understood, thereby enabling a hidden rule to be easily discovered. Consequently, even if a conditional sentence which is presented as character information, an $x^2$ inspection value, or the like is not verified, it is possible to perform the sorting, narrowing, and the like of the data belonging to similar classifications.

(Use of the Data Mining Result)

According to the invention, the data mining apparatus further has an output processing unit for converting the processing result of the classification processing unit into a format that can be used outside and outputting it.

(Inquiry of the Database)

The output processing unit converts a specific rule extracted from the result obtained by the classification processing unit into a conditional expression and outputs it to the outside. In this case, the output processing unit forms the extraction rule in a format of "IF~THEN~", converts it into a data extraction language which is used in the database, and outputs it. The output processing unit converts the extraction rule into an inquiry conditional expression for an application for controlling an SQL sentence, an LODQL sentence, an MDB command, or the like which is used in the database, and outputs it. Consequently, the rule of the data formed by the decision tree and recurrence tree of the data mining is designated to the data extracting conditional sentence to a relational database, a multidimensional database, and a multimedia database, thereby enabling the data to be extracted. In the rule formation in the data mining, an unknown classifying condition which is discovered by the algorithm of the classification is displayed as a tree diagram. By showing it as a data extracting condition to the database, data can be extracted from the database by a cut end of the unknown condition. Consequently, the extracted data can be used for a ranking process of the customers, selection of the customers as targets of marketing, and the like using the rule of a new analysis item condition which could not be discovered so far.

(Macro for the Spreadsheet)

The output processing unit converts the extraction rule into a macro module (macro) of a spreadsheet and outputs it. Accordingly, a macro functioning as a filter in which the conditional sentence in the "IF~THEN~" format formed by the data mining can be used by a famous spreadsheet product such as Microsoft Excel or the like is formed. The partial rule extracted from the data mining result is fed back to the macro module of the spreadsheet, so that the result of the data mining can be used as one of tools for analyzing the database. By forming the conditional sentence indicative of a feature of the data formed by using the algorithm of the classification as a micro module for extracting data from the spreadsheet such as Excel or the like, simple data extraction on a personal computer by an unknown cut end can be simply performed. Owing to the feature such that the macro module can be distributed again, when the customers are selected from the customer information, the unknown analysis item condition discovered by the data mining can be used as a cut end of the information analysis.

(Making of the Text From the Tree Diagram)

The output processing unit converts the tree diagram obtained by the classification processing unit into drawing information which can be drawn by an external application and outputs it. By making the text from the drawing information of the tree diagram obtained as a result of the classification as mentioned above, the condition of the branch node of information which is inherently expressed as a tree diagram, a ratio of the records included in the branching condition, a confidence degree of the condition, and the like are outputted as information to a file. The tree diagram can be displayed and used in another application. As the most general algorithm among the algorithms for the classification, there is a tree diagram as a display of the result of the decision tree. According to the invention, the tree diagram obtained as an analysis result using the algorithm of the decision tree is converted into the drawing information which can be used by the user, so that it is possible to draw the tree diagram of the product of an independent software vendor (ISV) or the tree diagram peculiar to the user. Consequently, it is possible to develop and use other products in each of which a mining engine of the decision tree has been assembled, so that a width in use of the decision tree becomes wide.

(Customization of the Extraction Rule)

The output processing unit converts the rule in the "IF~THEN~" format extracted from the result of the classification processing unit into a format designated by the user and outputs it. Thus, there is provided an interface function which can customize even the rule in the "IF~THEN~" format into a desired format of the user and display it. As mentioned above, since the rule in the "IF~THEN~" format discovered by the data mining can be customized to the desired format of the user, the result of the data mining can be fed back and used in data management of the like of an actual business.

According to the invention, there is provided a computer-readable storage medium which stores a data mining processing program for discovering an unknown rule contained in a data group. In this case, the data mining processing program has processing steps having the same functions as those in the case of the apparatus construction.

The above and other objects, features, and advantages of the present invention will become more apparent from the following detailed description with reference to the drawings.

BRIEF DESCRIPTION OF THE DRAWINGS

FIGS. 1A and 1B are functional block diagrams of the invention combined with an online analytical processing system;

FIGS. 2A and 2B are explanatory diagrams of data processes in FIGS. 1A and 1B;

FIG. 3 is an explanatory diagram of an analysis sheet formed as an analysis result of FIGS. 1A and 1B;

FIG. 14 is an explanatory diagram of a tree diagram expressing the significance by allowing the nodes and leaves to have changes in shape and size based on attribution information;

FIGS. 20A to 20C are explanatory diagrams of an external outputting process in which a rule extracted from the classification result is used for inquiry of a database;

FIGS. 23A and 23B are explanatory diagrams of analysis sheets which are obtained before and after the narrowing process using the macro module formed in FIG. 22;

DETAILED DESCRIPTION OF THE PREFERRED EMBODIMENTS (System Construction) FIGS. 1A and 1B are functional block diagrams of a data mining apparatus of the invention combined with an online analytical processing (OLAP) system. Between a client 10 and a server 12, the client 10 provides a graphic user interface (GUI) for the user and realizes a processing function of an online analytical processing system 14 and the data mining apparatus of the invention. An online analytical processing tool 16, a visualizer 18 constructing a display unit as a GUI, and a mining tool 26 are provided for the client 10. On the other hand, an online analytical processing unit 20, an analytical dictionary 22, a data warehouse (DWH) 24 in which a large amount of data serving as analysis targets has been stored, and further, a data mining processing unit 28 are provided for the server 12. The online analytical processing system 14 is constructed by: the online analytical processing tool 16 of the client 10; and the online analytical processing unit 20 and analytical dictionary 22 of the server 12. The online analytical processing system 14 is used for forming an analysis result in which the large amount of data stored in the data warehouse 24 has been rearranged as a cross spreadsheet having a slip image, allowing the user to find a problem while seeing the cross spreadsheet, and searching a cause of the problem. Specifically speaking, in the online analytical processing system 14, a cut end of information is defined as a management pointer, a summing process is performed every defined cut end, and the data is rearranged in a format of the cross spreadsheet. A procedure for an analyzing process by the online analytical processing system 14 is, for example, as follows. The user issues an analyzing request to the online analytical processing unit 20 by using an analyzing request picture plane which is provided by the online analytical processing tool 16 via the visualizer 18. A cut end of the data to be analyzed is defined as a management pointer in the analyzing request. For example, in the case where a large amount of data including items (segments) such as year, country, fuel economy (MPG), the number of cylinders, horsepower, weight, and acceleration has been stored in a field in the data warehouse 24 in which a type of a vehicle is set to one record as sales data of the vehicle, for example, "value of year" among a plurality of items is defined as a cut end of the analyzing request. The online analytical processing unit 20 receives the analyzing request by the user from the online analytical processing tool 16, extracts a specific analysis item as a filter from the analytical dictionary 22, performs summing and modifying processes with respect to the data in the data warehouse 24 as targets, and outputs a sum result to the online analytical processing tool 16 in a format of an analysis sheet (detailed data or a spreadsheet). The online analytical processing tool 16 receives the analysis result from the online analytical processing unit 20 and displays the analysis sheet (detailed data or a spreadsheet) onto the visualizer 18. A parallel coordinate graph on which each analysis item of the analysis sheet obtained as an analysis result is set to an axis and a polygonal line is formed by plotting a value of each data is also displayed on the visualizer 18.

Figure 2B:
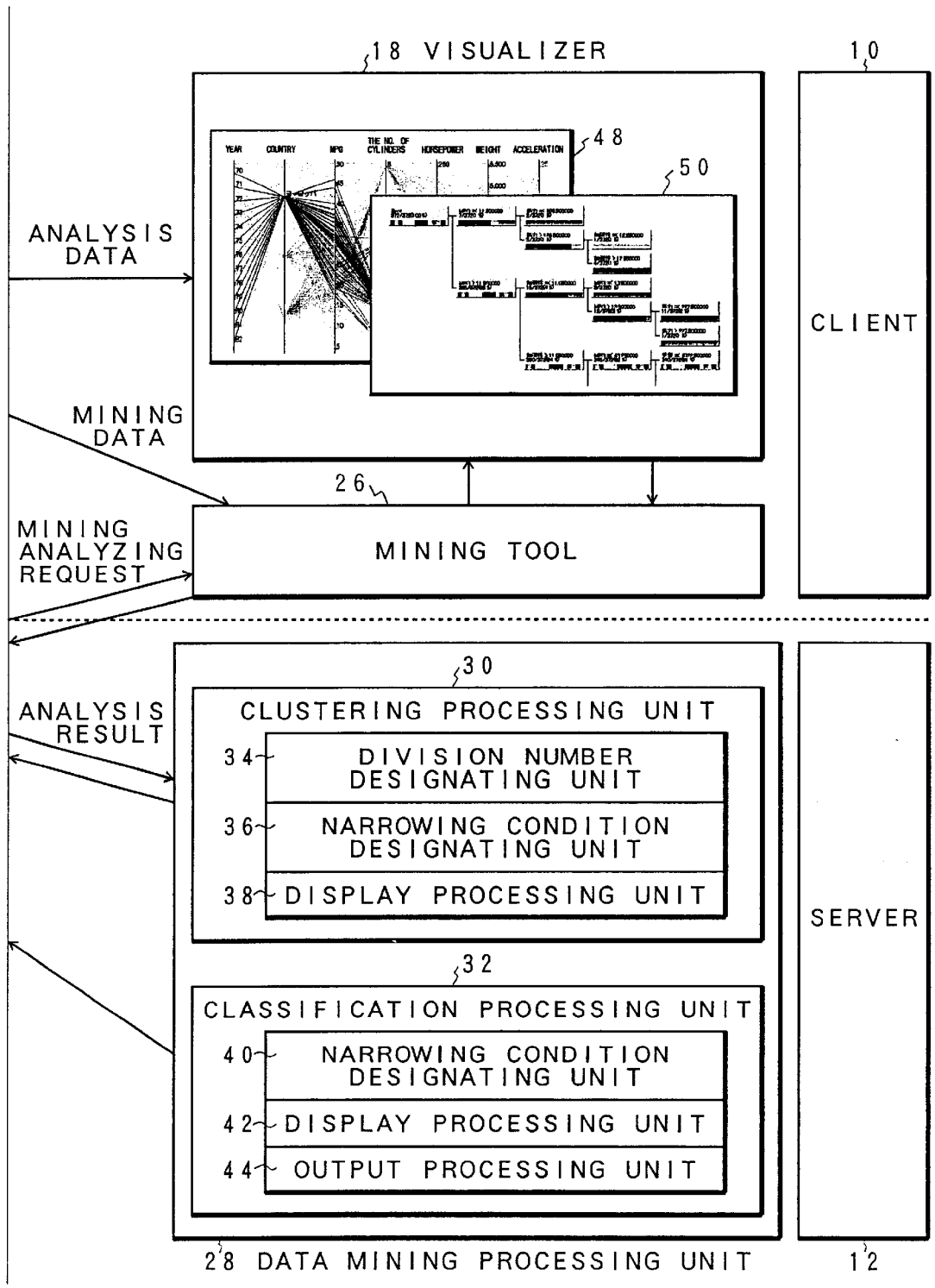

The data mining apparatus of the invention is constructed by the mining tool 26 of the client 10 and the data mining processing unit 28 of the server 12. The mining tool 26 of the client 10 functions as a graphical user interface GUI for the user by the displaying process by the visualizer 18. The data mining processing unit 28 is provided for the server 12. In the embodiment, a clustering processing unit 30 and a classification processing unit 32 are provided for the data mining processing unit 28. When a mining analyzing request is received from the mining tool 26, the data mining processing unit 28 performs a data mining with regard to an analysis sheet (detailed data or a spreadsheet) stored as an analysis result in the online analytical processing tool 16 of the client 10 in the online analytical processing system 14 as target data. Therefore, the mining tool 26 transfers the analysis result stored in the online analytical processing tool 16 as mining target data via the online analytical processing unit 20 in response to the mining analyzing request to the data mining processing unit 28 by the user. The clustering processing unit 30 provided for the data mining processing unit 28 performs a classifying process for automatically collecting similar data into a same group by using an algorithm called a Word method or the like. The division number in the clustering process is designated by the user. In the clustering processing unit 30 of the invention, with respect to the division number in the clustering, a range of the division number from 2-division to an arbitrary N-division is designated by a division number designating unit 34. In the designation of the range of the division number, a value of the arbitrary division number N can be also set by the user designation from the mining tool 26 side. In the embodiment, a case where the range of the division numbers from 2-division to N=5 division has been designated is shown as an example. On the basis of the designation of the range from 2 to N=5 of the division number by the division number designating unit 34, the clustering processing unit 30 performs the clustering for classifying the data having similar characteristics into a plurality of clusters (layers), namely, into groups every division number in a range from 2-division to 5-division. On the basis of the processing result for every division number by the clustering processing unit 30, a display processing unit 38 simultaneously displays a plurality of processing results every division number onto the visualizer 18 on the client 10 side. A narrowing condition designating unit 36 is provided for the clustering processing unit 30. The narrowing condition designating unit 36 narrows down the range of the data that is handled by the clustering processing unit 30 by the user designation. For example, there are the following narrowing conditions in the clustering process.

(I) Range of the number of records of target data group (II) Range of a value of each analysis item Simultaneously with the display of a plurality of clustering processing results in a range from 2-division to 5-division, the display processing unit 38 provided for the clustering processing unit 30 displays a parallel coordinate graph on which a polygonal line is formed by plotting the classification result of each analysis item to the axis of each analysis item by using a parallel coordinate graph similar to that used for the display of the analysis result of the online analytical processing system 14. The display processing unit 38 also arranges the dividing axes in a range from 2-division to 5-division and simultaneously displays the transition of the division and a connection between the classification results by a polygonal line. The display processing unit 38 provided in the clustering processing unit 30 of the invention converts the classification results in a range from 2-division to 5-division by the clustering into an annual ring diagram for discriminating the optimum division number and displays. With respect to a data group of an analysis sheet having a plurality of analysis items obtained as an analysis result of the online analytical processing system 14 as targets, the classification processing unit 32 provided in the data mining processing unit 28 forms the characteristics of the specific analysis item among a plurality of analysis items in accordance with the algorithm of the decision tree by predicting an unknown rule in which the other analysis items are expressed as condition values. The classification processing unit 32 has a narrowing condition designating unit 40, a display processing unit 42, and an output processing unit 44. In a manner similar to the narrowing condition designating unit 36 of the clustering processing unit 30, the narrowing condition designating unit 40 designates narrowing conditions for narrowing a range of data which is handled by the classification processing unit by the user designation. As narrowing conditions, there are the following items.

(I) Range of the number of layers of the tree diagram which is displayed as a processing result (II) Range of the number of records of the target data (III) Range of the value of each analysis item And the like.

When the classification processing result is expressed by a tree diagram and displayed to the user by the visualizer 18, the display processing unit 42 of the classification processing unit 32 improves a display method so that the user can easily find the data having significance. The improvement of the display by the tree diagram of the classification processing result includes the following processes.

(I) Folding process in which the node having no significance is not displayed (II) Process for expressing the node having significance in accordance with the shape, size, or the like of the node (III) Process for evaluating the node having significance and sorting the tree diagram on the basis of the evaluation result And the like.

Further, the classification processing unit 32 has the output processing unit 44. Besides the function for providing the unknown rule discovered from the processing result of the classification processing unit 32 as mere display information for the user by the visualizer 18, the output processing unit 44 has a function for converting the processing result into a format which can be used by an external application and outputting.

Processing contents by the output processing unit 44 has, for example, the following contents.

(I) Conversion to the database inquiry conditional expression which is used in the online analytical processing system 14 or the like and output (II) Conversion to the macro module which is used as an analyzing filter of the spreadsheet of the online analytical processing system 14 or the like and output (III) Conversion from the tree diagram into the drawing information which can be used in the external application and output (IV) Edition for converting the unknown rule extracted from the processing result into the desired format of the user and output FIGS. 2A and 2B show an example of data processes in the data mining apparatus of the invention in FIGS. 1A and 1B combined with the online analytical processing system 14. The online analytical processing system 14 issues an analyzing request for obtaining, for example, an analysis sheet 46 as an analysis result from the online analytical processing tool 16 to the online analytical processing unit 20. In response to the analyzing request, a filter of a specific analysis item is formed by the analytical dictionary 22. With respect to a large amount of data stored in data files 24-1, 24-2, 24-3, and 24-4 of the data warehouse 24 as targets, summing and modification for obtaining the analysis result of the analysis sheet 46 are performed, a processing result is notified to the online analytical processing tool 16, and the analysis sheet 46 of the slip images is made. The analysis sheet 46 which is formed in the online analytical processing system 14 is taken out and shown in FIG. 3. To form the analysis sheet 46, the data of one record has been stored, for example, every sales vehicle on the data files 24-1 to 24-4 side of the data warehouse 24. As attribute information, the fields of this record include "year, country, MPG (fuel economy), the number of cylinders, horsepower, weight, and acceleration". Those values of the fields become the contents of the analysis items arranged in the upper column in the analysis sheet 46. The analysis sheet 46 corresponds to the analysis result in the case where "value of year" among a plurality of items is defined as a cut end of the information in the analyzing request and the analyzing request is executed. The cut end can be defined with respect to "country", "MPG (fuel economy)", "the number of cylinders", "horsepower", "weight", or "acceleration" as another item as necessary. One or a plurality of items can be defined.

With respect to the data of the analysis sheet 46 obtained as an analysis result of the online analytical processing system 14 as shown in FIG. 3 as targets, the data mining apparatus of the invention performs the data mining for discovering an unknown rule included in the data. The mining tool 26 provided in the client 10 in FIGS. 2A and 2B issues a data mining analyzing request by which characteristics (function or profile) the characteristics of "value of year" as a cut end existing in the head item in the analysis sheet 46 can be expressed by the values of a group of the other items to the data mining processing unit 28. The data mining analyzing request is described in a format of, for example, "which characteristics the value of year has". As contents of the data mining analyzing request, any of the items "country", "MPG (fuel economy)", "the number of cylinders", "horsepower", "weight", and "acceleration" other than "value of year" can be also defined and requested. For example, an analyzing request such as "which characteristics the country has", "which characteristics the MPG (fuel economy) has", "which characteristics the number of cylinders has", "which characteristics the horsepower has", "which characteristics the weight has", or "which characteristics the acceleration has" can be also issued to the data mining processing unit 28. Even in the data mining analyzing request as well, the analyzing request can be performed not only for one characteristic but also a combination of a plurality of characteristics. Since the characteristics of the specific item in the data mining analyzing request correspond to the item of the cut end of the analysis sheet 46 by the online analytical processing system 14, the user needs to designate the item of the characteristics to be obtained by the data mining analyzing request in correspondence to the item of the cut end of the analyzing request in the online analytical processing system 14. The clustering processing unit 30 of the data mining processing unit 28 which received the data mining analyzing request from the mining tool 26 designates a range of a plural division number in a range from 2-division to N-division, for example, 5-division designated by the division number designating unit 34. With respect to the data of the analysis sheet 46 obtained as an analysis result of the online analytical processing system 14 as targets, the clustering for classifying the data having similar characteristics into a plurality of clusters (layers), namely, groups is executed by using the narrowing conditions designated from the user by the narrowing condition designating unit 36. The processing result by the clustering is displayed as a parallel coordinate graph 48 by the visualizer 18.

Figure 4:
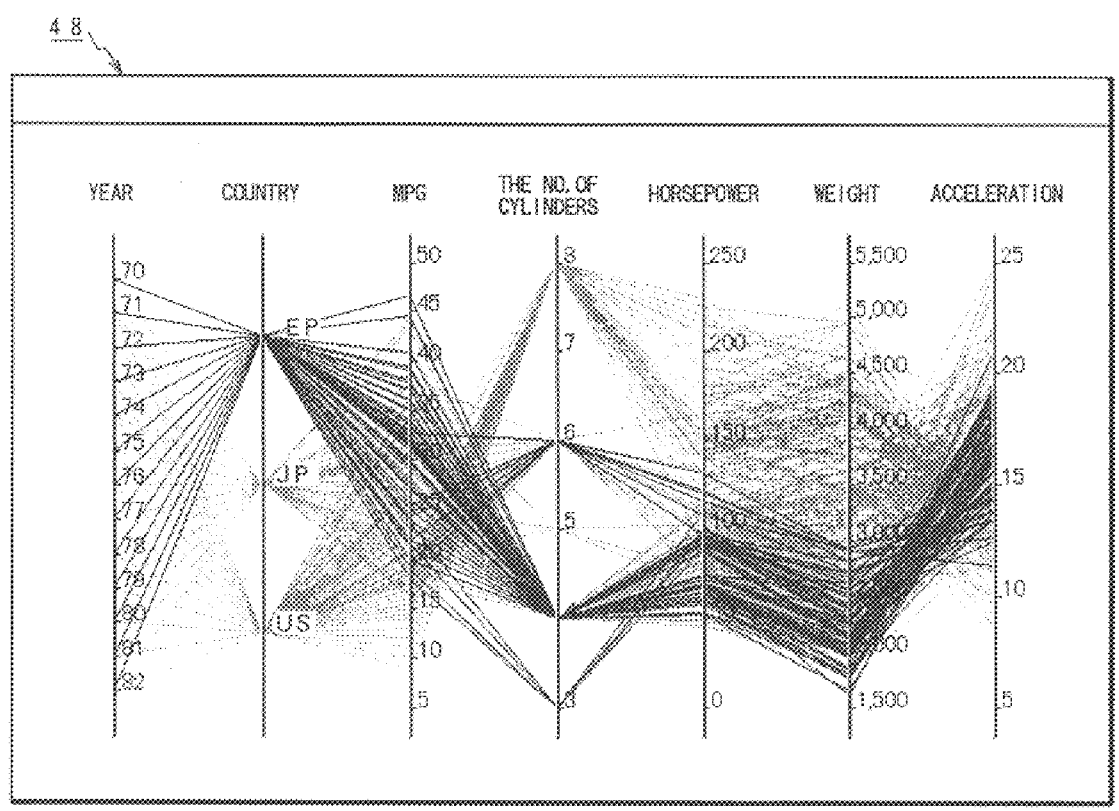
FIG. 4 is an explanatory diagram of a parallel coordinate graph which is displayed as a result of a clustering in FIGS. 1A and 1B.

FIG. 4 extracts and shows the parallel coordinate graph 48 as a clustering processing result displayed by the visualizer 18 in FIGS. 2A and 2B. As for the parallel coordinate graph 48, seven axes corresponding to "year", "country", "MPG (fuel economy)", "the number of cylinders", "horsepower", "weight", and "acceleration" as analysis items of the analysis sheet 46 serving as targets of the clustering process are arranged in parallel, the values of each record are plotted onto each axis, and the values of each item belonging to the same record are expressed by a graph of a polygonal line obtained by coupling the value of each item belonging to the same record by a straight line. The division number in the display of the parallel coordinate graph 48 relates to the display of the clustering result based on the designation of 5-division. By the display of the clustering result by the parallel coordinate graph 48, with regard to "which characteristics the year has" as a data mining analyzing request, for the analysis item "year" shown at the left end, it is possible to visually grasp a state of grouping in each analysis item of "country, MPG (fuel economy), the number of cylinders, horsepower, weight, and acceleration" which are arranged and shown on the right side. In the invention, in addition to the display of each analysis item of the parallel coordinate graph 48 as such a clustering result, each clustering result in a range from 2-division to, for example, 5-division designated by the division number designating unit 34 is simultaneously displayed as will be obviously explained hereinlater, thereby allowing the user to recognize the optimum division number.

Referring again to FIGS. 2A and 2B, with respect to the data of the analysis sheet 46 obtained as a processing result of the online analytical processing system 14 as targets, the classification processing unit 32 which received the data mining analyzing request for "which characteristics the year has" from the mining tool 26 forms the analysis item "characteristics of the value of the year" designated by the analyzing request in accordance with the algorithm of the decision tree by predicting an unknown rule in which "country, MPG (fuel economy), the number of cylinders, horsepower, weight, and acceleration" serving as other analysis items are expressed as condition values. The processing result is displayed as a tree diagram 50 by the visualizer 18.

Figure 5A:
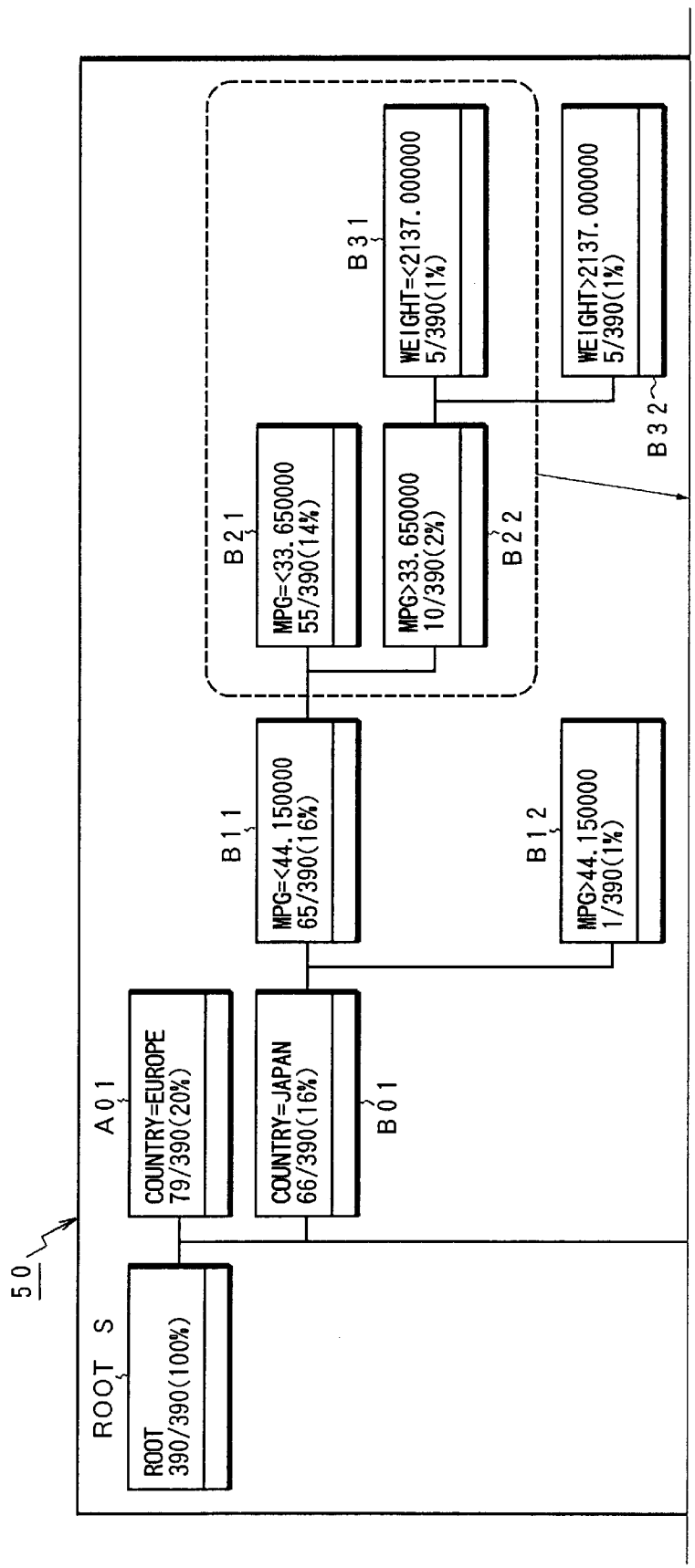
FIGS. 5A and 5B are explanatory diagrams of a tree diagram which is displayed as a result of a data mining in FIGS. 1A and 1B.
Figure 5B:
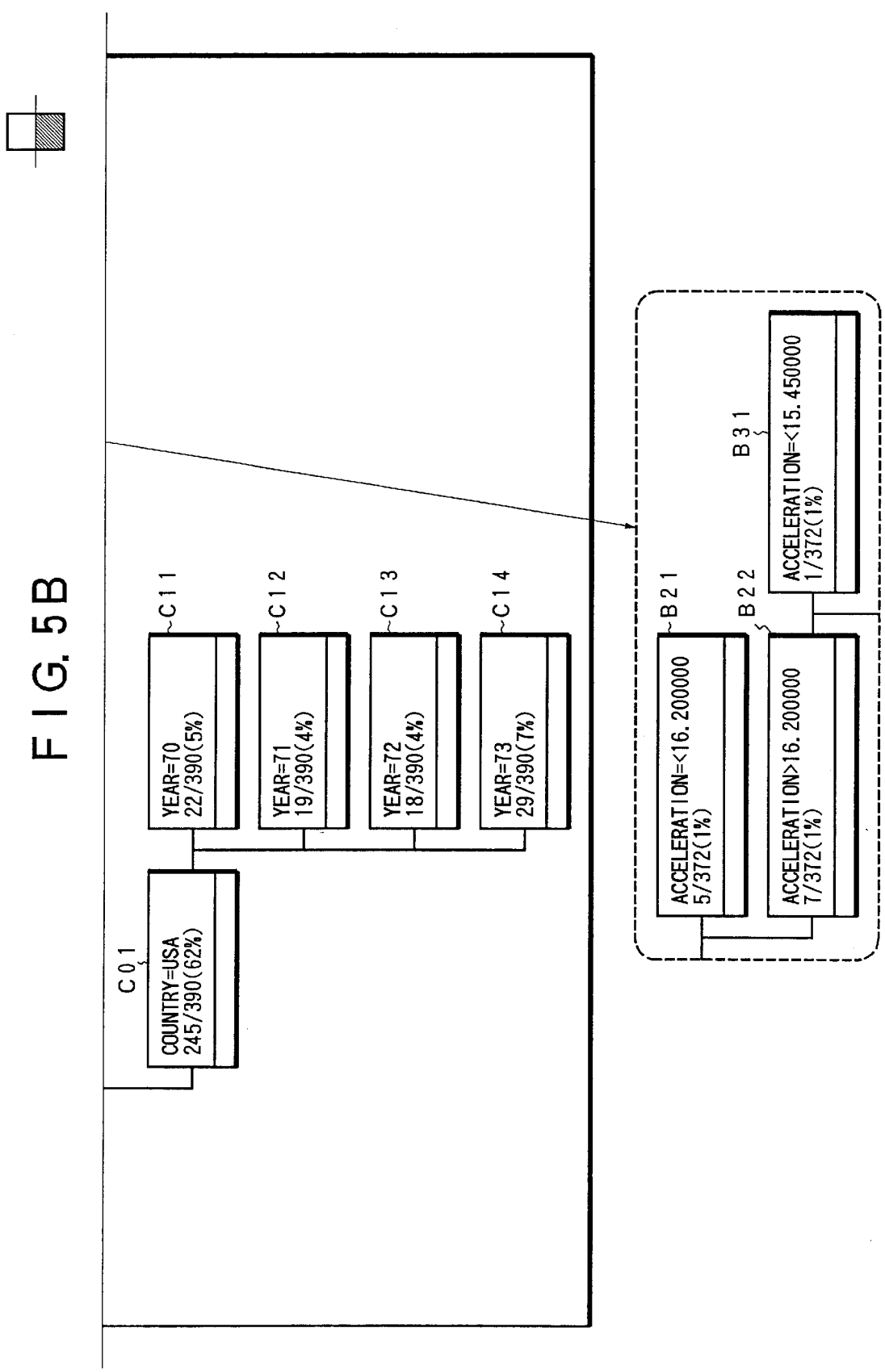

FIGS. 5A and 5B show the tree diagram 50 as a classification result displayed by the visualizer 18 in FIGS. 2A and 2B. The tree diagram 50 includes nodes of a plurality of layers in which a root S described by using the total number of records as a parameter is set to a start point and finally ends by a leaf. That is, the root S is set to a start point and the tree diagram is classified into nodes A01, B01, and C01. Among them, the node A01 becomes a leaf because there is no lower node. The node B01 is further separated into nodes B11 and B12. The node B12 between them becomes a leaf because there is no lower node. The node B11 is classified into nodes B21 and B22. The node B22 is further separated into nodes B31 and B32. The nodes B21, B31, and B32 become leaves because they are the final nodes. Further, the node C01 is classified into nodes C11, C12, C13, and C14 and the nodes C11 to C14 become leaves because they are the final nodes.

Portions of the leaf B21, node B22, and leaf B31 in the tree diagram 50 are taken out and enlargedly shown on the lower side. The leaf B21 relates to the condition of the item "groups divided into four groups by clustering=1-group". From this condition, an unknown rule of "the MPG (fuel economy) of the characteristics of a vehicle of the 1-group is equal to or less than 33.65" can be discovered. Since the node B22 and leaf B31 are conditions of "groups divided into four groups by clustering=3-group", from those conditions, an unknown rule of "the MPG of the characteristics of the vehicle of the 3-group is larger than 33.65 and a weight exceeds 2137" can be discovered. A numerical value shown on the lower side of the analysis item "acceleration" shown in the leaves B21 and B31 and the node B22 indicates the number of relevant records in the total number of records (=390) and is expressed in a format of (the relevant record)/(the total number of records) %. In the display processing unit 42 provided in the classification processing unit 32 of the invention, the expression in the visualizer 18 of the tree diagram 50 obtained as a processing result as shown in FIGS. 5A and 5B is improved and the unknown rule is presented so that it can be easily understood by the user. The output processing unit 44 provided in the classification processing unit 32 in FIGS. 2A and 2B converts the tree diagram 50 as a processing result in FIG. 6 into a format which can be used by the external application and outputs it.

Figure 6:
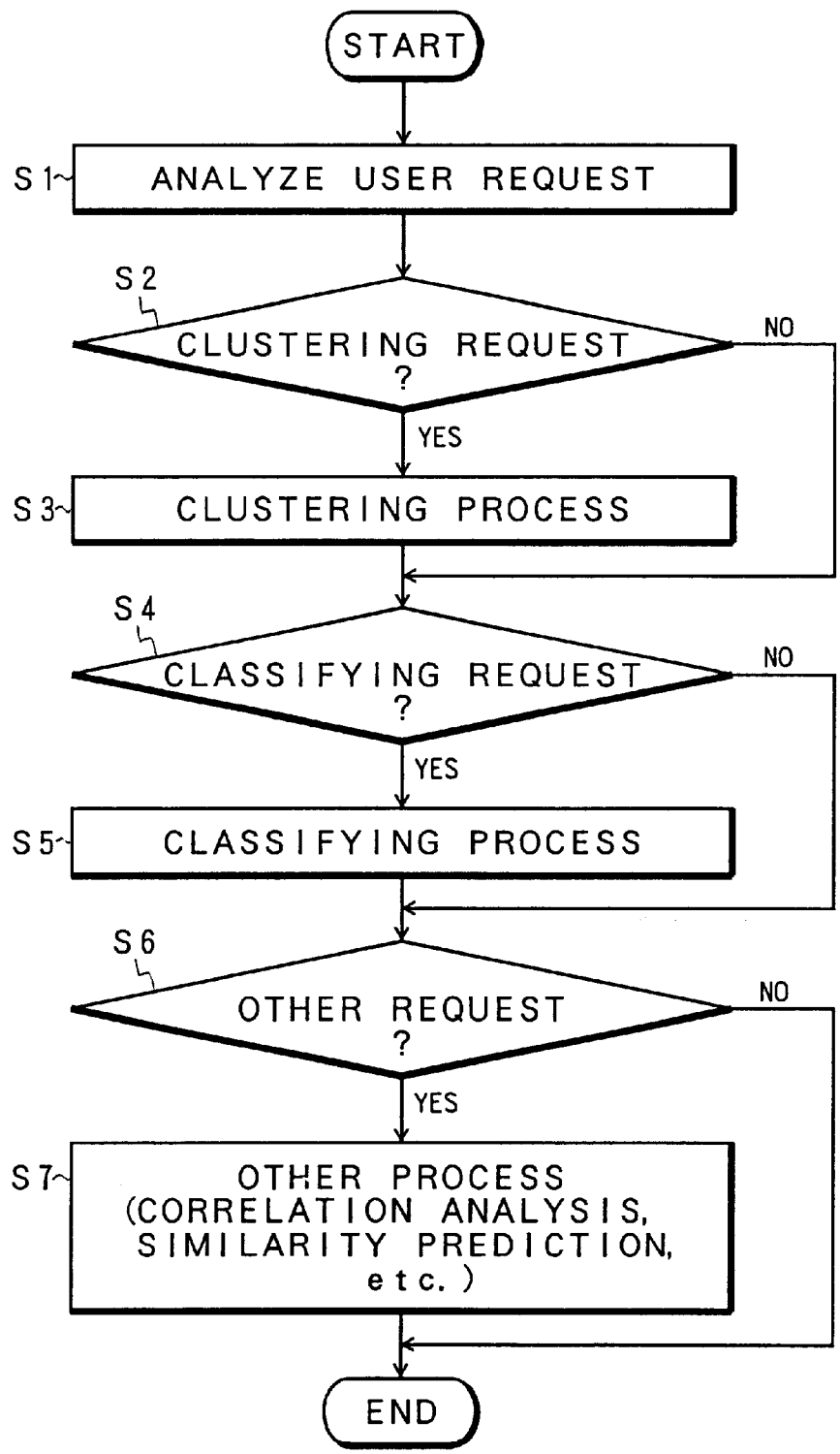
FIG. 6 is a flowchart for a data mining process according to the invention.

FIG. 6 is a flowchart for the processing operation by the data mining processing unit 28 provided on the server 12 side in FIGS. 2A and 2B. First, in step S1, a mining analyzing request of the user by the mining tool 26 provided for the client 10 is analyzed to see if it is a clustering request in step S2. If it is the clustering request, the processing routine advances from step S2 to step S3 and the clustering process is performed. If it is the classifying process, whether the user request is the classifying request or not is discriminated in step S4. Step S5 follows and the classifying process is executed. If the user request is the other request in step S6, step S7 follows and a correlation analysis, a similarity prediction, or the like is executed as other processing.

(Optimum Division Number of Clustering)

Figure 7:
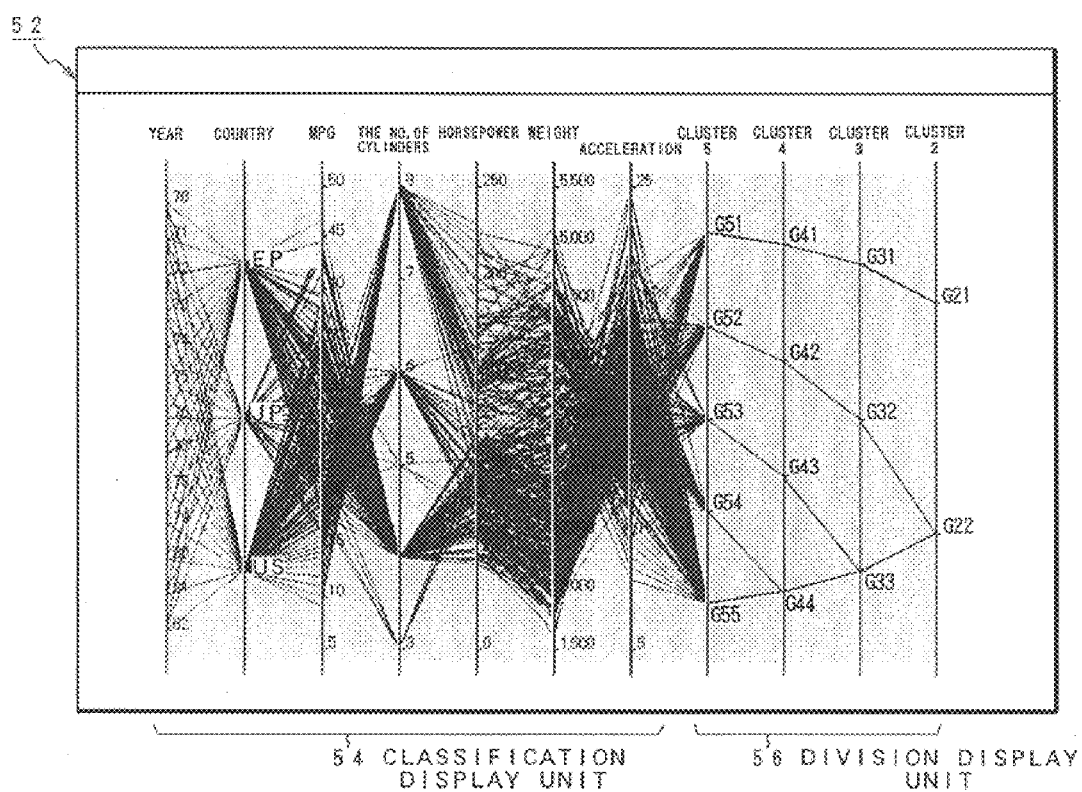
FIG. 7 is an explanatory diagram of a parallel coordinate graph on which a relation between the clustering result and a division number is simultaneously displayed.
Figure 8A:
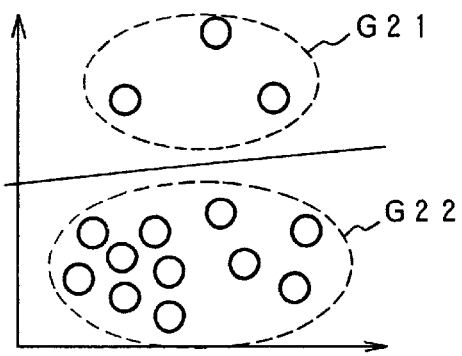
FIGS. 8A to 8D are explanatory diagrams of classification groups corresponding to division displays displayed on the parallel coordinate graph of FIG. 7.
Figure 8B:
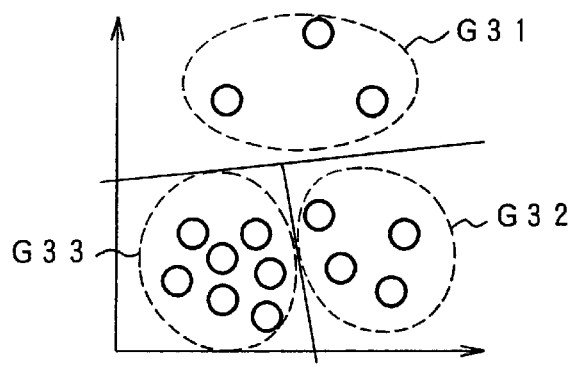
Figure 8C:
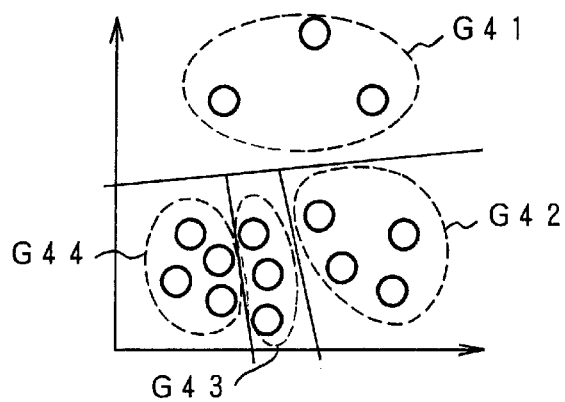
Figure 8D:
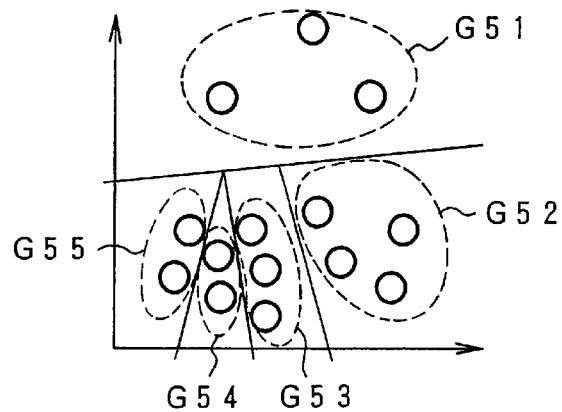

FIG. 7 shows a parallel coordinate graph 52 in the case where a plurality of clustering results by the designation of the division number in a range from 2-division to, for example, 5-division are simultaneously displayed by the display processing unit 38 provided for the clustering processing unit 30 in FIGS. 2A and 2B. The parallel coordinate graph 52 is constructed by: a classification display unit 54 for displaying a classification result by the clustering; and a division display unit 56 for showing a state of grouping in a range from 2-division to 5-division. The clustering result in the case where 5-division as a maximum division number in the range of the division number has been designated, namely, the value of the analysis item "year" in FIG. 4 is displayed in the classification display unit 54 as a parallel coordinate graph in which the other analysis items "country, MPG (fuel economy), the number of cylinders, horsepower, weight, and acceleration" are expressed as condition values. The axes showing the dividing range are arranged in parallel on the right side of the classification display unit 54 in order of the 5-division axis, 4-division axis, 3-division axis, and 2-division axis. Values G51 to G55 showing 5-division, values G41 to G44 showing 4-division, values G31 to G33 showing 3-division, and values G21 and G22 showing 2-division are plotted to the respective dividing axes. As shown by a broken line, a polygonal line of grouping of the target data is displayed from the 2-division axis toward the 5-division axis of the division display unit 56. The polygonal line of grouping in the dividing axes is, for example, plotted on the basis of the grouping due to the clustering in a range from 2-division to 5-division as shown in FIGS. 8A to 8D. FIG. 8A shows a case where the target data is clustered by the designation of 2-division, and it is classified into groups G21 and G22. FIG. 8B relates to the designation of 3-division and the group G22 in the 2-division in FIG. 8A is divided into two groups G32 and G33. FIG. 8C relates to the designation of 4-division and the group G33 in the 3-division in FIG. 8B is divided into two groups G43 and G44. Further, FIG. 8D relates to the designation of 5-division and the group G44 in the 4-division in FIG. 8C is divided into two groups G54 and G55. In correspondence to the grouping by the clustering in a range from 2-division to 5-division shown in FIGS. 8A to 8D, a state of the grouping is displayed by a polygonal line of broken lines from the 2-division axis to the 5-division axis in the division display unit 56 in FIG. 7. The polygonal line is coupled from five values G51 to G55 due to the 5-dividing axis for the record of the left analysis item "acceleration". The user looks at the parallel coordinate graph 52 in which the classification display unit 54 and division display unit 56 are simultaneously displayed. Therefore, when the division number increases from 2-division to 5-division, from which analysis item the 5-division groups G51 to G55 have been originated can be clearly recognized. Particularly, the proper division number in each item can be easily discovered by separately coloring the lines originated from the groups G51 to G55 in five colors. Therefore, which division number is proper at the time of the classification by the clustering can be easily understood for the user. By recognizing the optimum division number, the use of the clustering result in the business field is made further useful.

Figure 9:
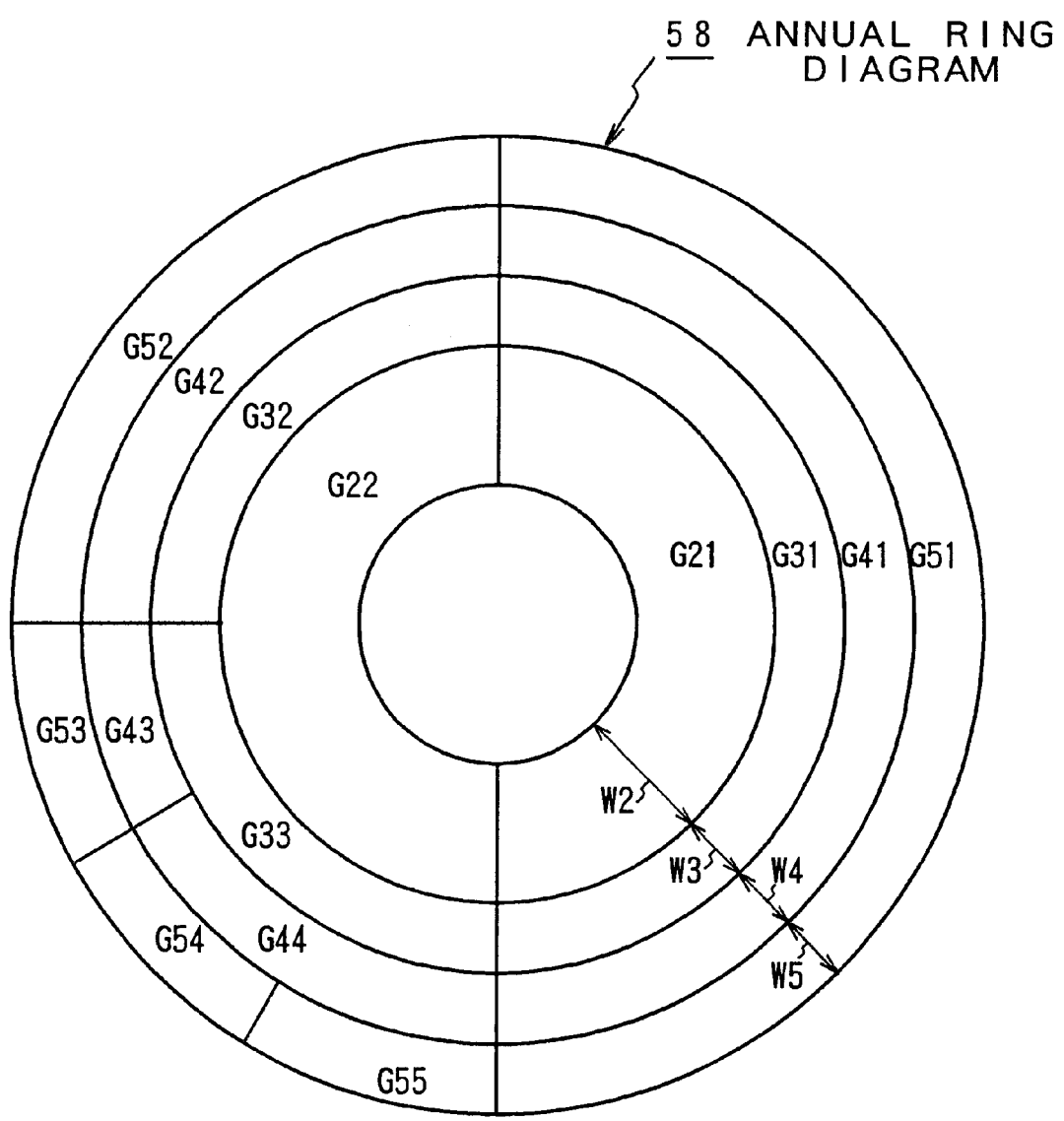
FIG. 9 is an explanatory diagram of an annual ring diagram expressing a relation between a classification result and the division number.

FIG. 9 is an explanatory diagram of annual rings for discriminating the optimum division number by the display processing unit 38 provided in the clustering processing unit 30 in FIGS. 2A and 2B. As for an annual ring diagram 58 which is used for discrimination of the optimum division number, for example, with respect to the 2-division to 5-division in the range of the division number designated for a center circle, a state of the grouping of the clustering result by the designation of each division number is expressed by one annual ring. As for this annual ring, as the ring approaches the outer peripheral, the division number increases. That is, the center indicates the annual ring of no division. Subsequently, the annual rings of 2-division, 3-division, 4-division, and 5-division are shown. The annual rings in the 2-division to 5-division are divided into 2, 3, 4, and 5 in the radial direction, respectively. The division of each annual ring in this case corresponds to the grouping by the clustering from 2-division to 5-division in FIGS. 8A to 8D. That is, in the 2-division, the annual ring is divided into the right and left groups G21 and G22. In the 3-division, the group G22 of the 2-division is divided into the groups G32 and G33 of the 3-division.

In the 4-division, the group G33 of the 3-division is divided into the groups G43 and G44 in the 4-division.

Further, in the 5-division, the group G44 of the 4-division is divided into the groups G54 and G55 of the 5-division. A width of annual ring of each division, namely, widths W2, W3, W4, and W5 corresponding to the thicknesses in the radial direction show data distances between the groups at the time of grouping. For example, since the groups G21 and G22 in the annual ring of the 2-division are grouped as shown in FIG. 8A, the data distance is calculated with respect to the records included in each of the groups G21 and G22. In the calculation of the data distance, it is sufficient to obtain the average coordinate position of the groups G21 and G22 and obtain the data distance from the coordinate position. The user, therefore, can decide that the division number of the largest width is the optimum division number by seeing the annual ring diagram 58. In this case, since the width W2 of the annual ring of the 2-division is the largest, the user can immediately determine that the 2-division is the proper division number by seeing the annual ring diagram 58. The display of the proper division number by the parallel coordinate graph in FIG. 7 and the display of the proper division number by the annual ring diagram 58 in FIG. 9 can be simultaneously performed or can be selectively performed by the user designation.

Figure 10:
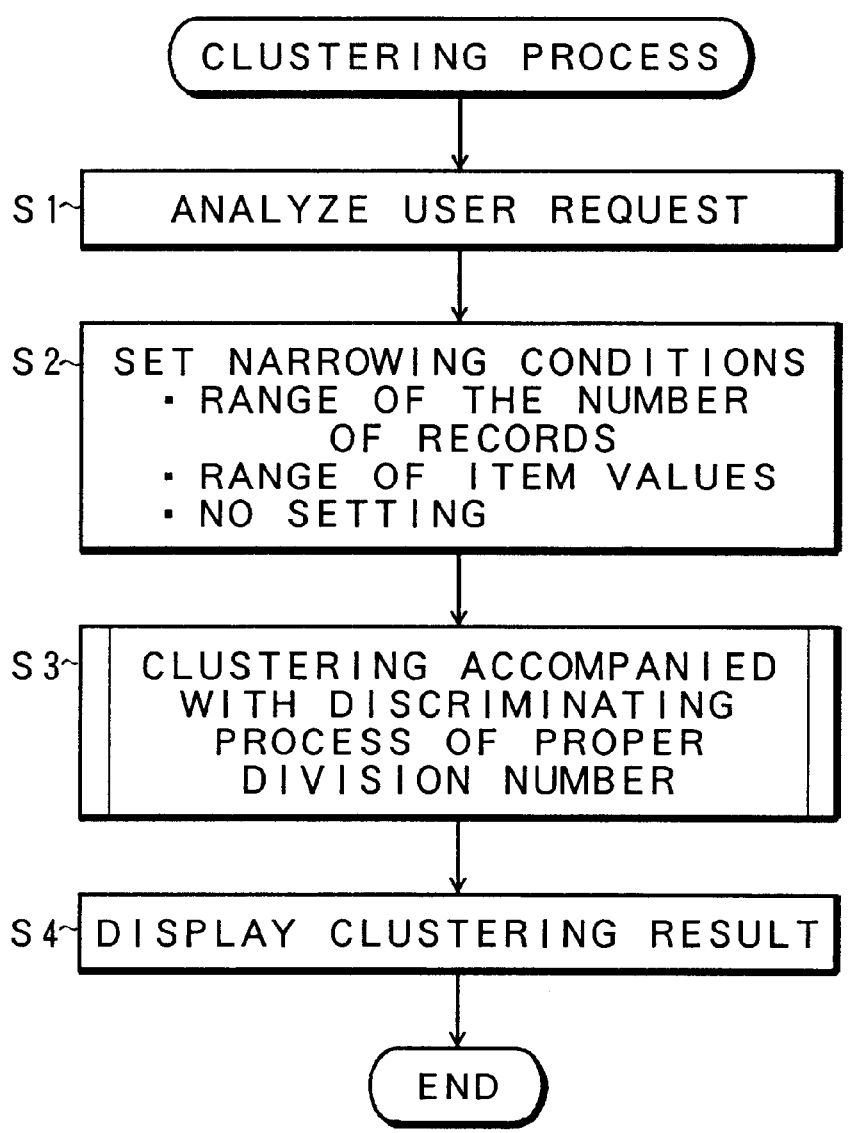
FIG. 10 is a flowchart for a clustering process according to the invention.

FIG. 10 is a flowchart for the processing operation of the clustering processing unit of the invention. First, in step S1, the data mining analyzing request from the user is analyzed and the specific item to be obtained and the other items serving as condition values expressing the characteristics of the item are recognized. For example, if the data mining analyzing request is "which characteristics the value of year has", the specific item is set to "value of year" and the items of the condition values expressing those characteristics are set to "MPG (fuel economy), the number of cylinders, horsepower, weight, and acceleration". Subsequently, the narrowing conditions of the user designation are set in step S2. They are a range of the number of records, a range of the item values, and the like. If all of the data is set to targets, the narrowing conditions are not set. Subsequently, in step S3, the clustering accompanied with the discriminating process of the proper division number is executed. In step S4, the parallel coordinate graph as shown in FIG. 4 is displayed as a result of the clustering.

Figure 11:
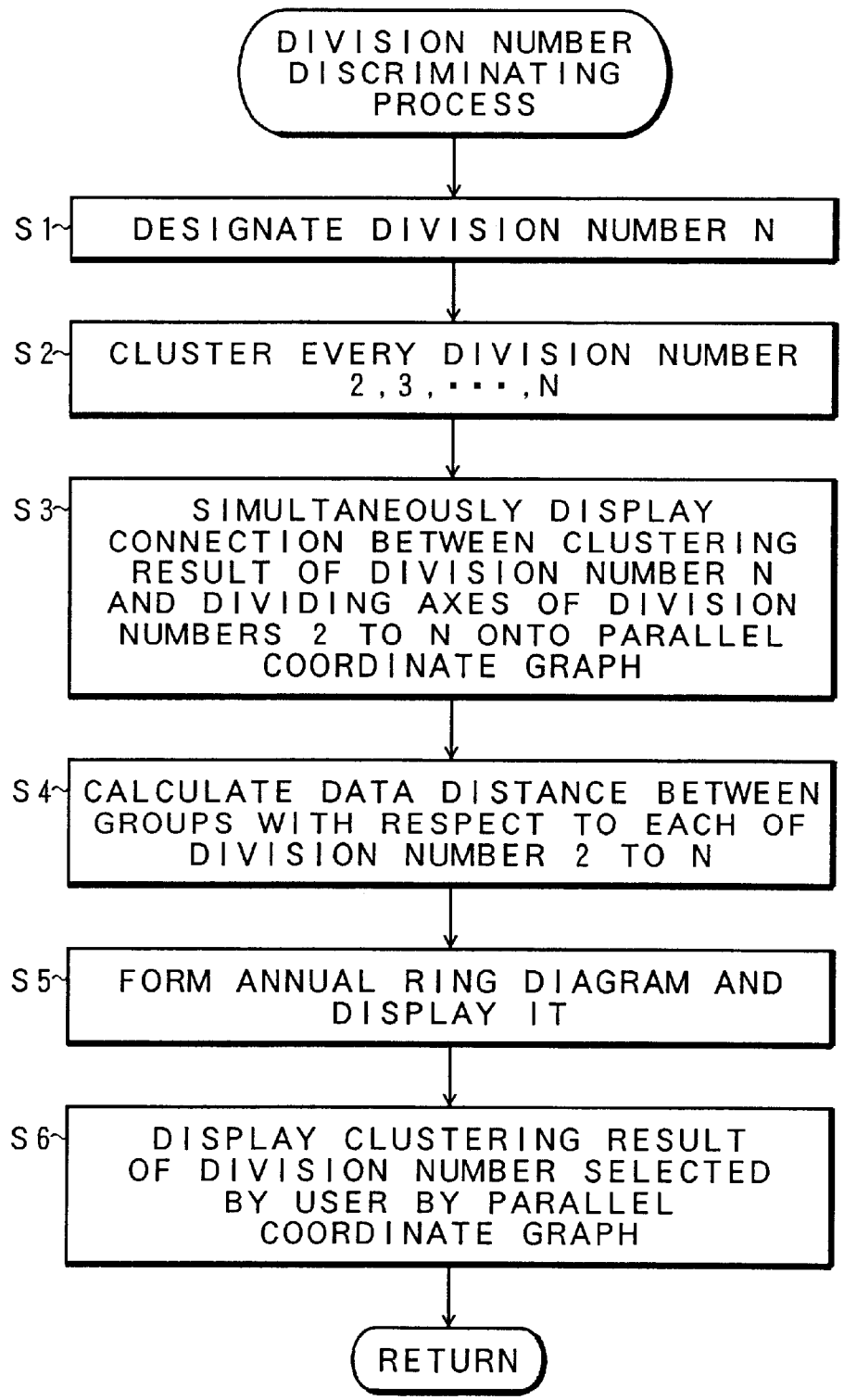
FIG. 11 is a flowchart for a clustering accompanied with a division number discriminating process.

FIG. 11 is a flowchart for the clustering process accompanied with the division discrimination in step S3 in FIG. 10. First, in step S1, a division number N serving as a maximum value of the dividing range is designated. In the designation of the maximum division number N, a default value which has been preset in the apparatus can be used or it can be arbitrarily designated by the user. In step S2, the clustering is executed every plural division numbers of 2, 3, . . . , and N. Subsequently, in step S3, the clustering result of the division number N and a connection of the division numbers 2 to N are simultaneously displayed on the parallel coordinate graph 52 as shown in FIG. 7. In step S4, a data distance between the groups is calculated with respect to each of the division numbers 2 to N. In step S5, the annual ring diagram 58 is formed and displayed as shown in FIG. 9. Finally, the user decides the optimum division number with reference to the parallel coordinate graph displayed in step S3 and/or the annual ring diagram displayed in step S5. The clustering result of the optimum division number selected by the user is displayed, for example, on the parallel coordinate graph 48 as shown in FIG. 4.

(Improvement of the Display of the Classification Result)

Figure 12:
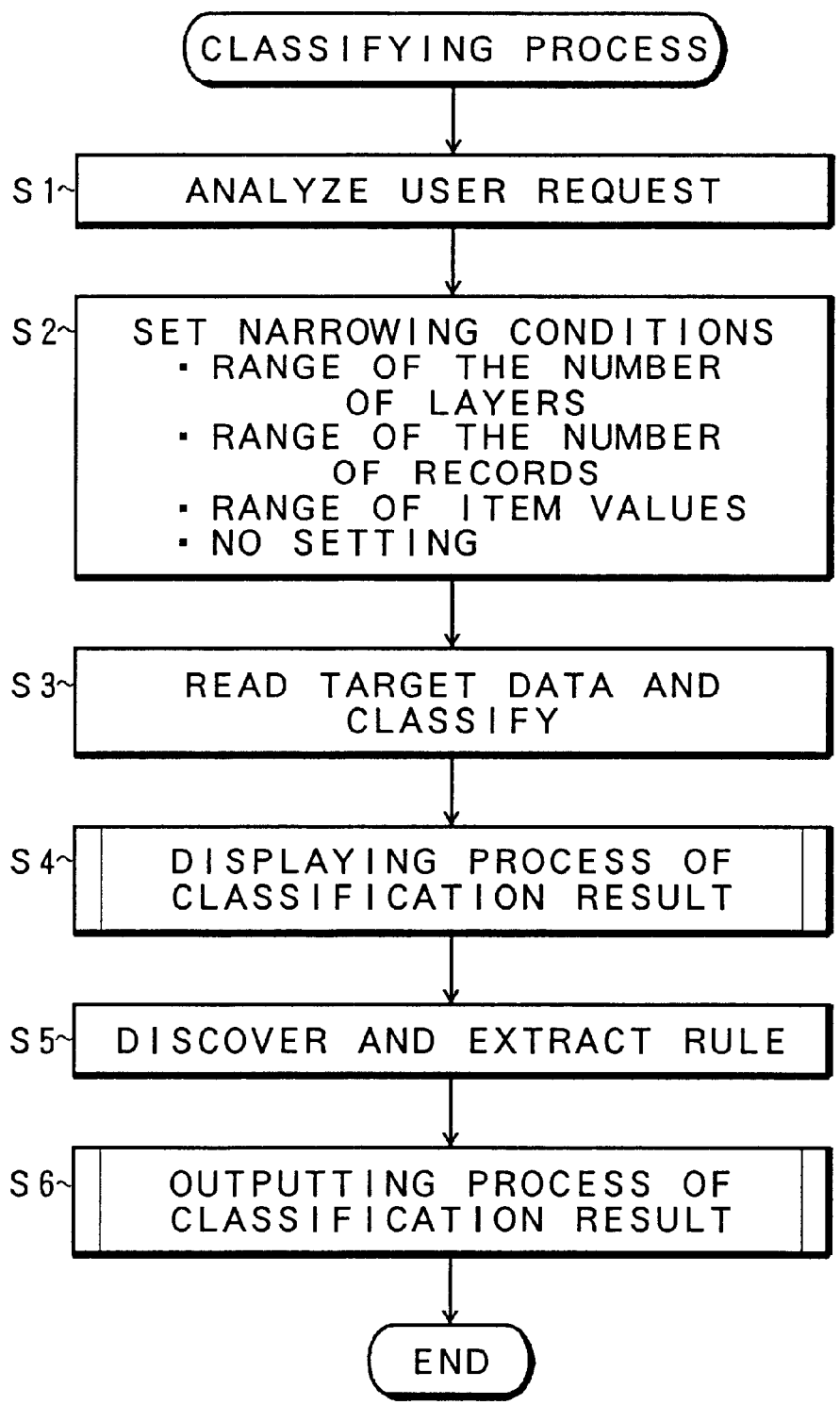
FIG. 12 is a flowchart for a classifying process according to the invention.

FIG. 12 is a flowchart for the processing operation by the classification processing unit 32 provided in the data mining processing unit 28 in FIGS. 1A and 1B. In the classifying process, first, in step S1, the data mining analyzing request by the user from the mining tool 26 is analyzed. The data mining analyzing request is, for example, "which characteristics the value of year has" and it is recognized that the user request is an analyzing request in which the analysis item "value of year" is expressed by an unknown rule in which the other analysis items are expressed as condition values. Subsequently, in step S2, the narrowing conditions are set on the basis of the user designation. The user can designate a range of the number of layers of the tree diagram, a range of the number of records of the target data, and a range of the values in the respective analysis items which are displayed as a classification result. If there is no designation, the classification is performed with respect all of the data as targets. In step S3, the target data is read on the basis of the data mining analyzing request and the designation of the narrowing conditions of the user and a classifying process for classifying, for example, the characteristics of the analysis item "value of year" in accordance with the algorithm used at the time of the decision in order to express those characteristics by the unknown rule in which the other analysis items "country, MPG, the number of cylinders, horsepower, weight, and acceleration" are expressed as condition values is executed. In step S4, a displaying process for displaying the classification result as a tree diagram is performed. In the invention, at the time of the displaying process, in order to display the portion with a significance of the tree diagram so that it can be easily recognized by the user, the folding process such that the nodes having no significance are not displayed, the process for displaying the nodes with a significance by sizes and shapes of the nodes, and further, the display of the tree diagram sorted on the basis of the evaluation of the significance of the node are executed as necessary. In step S5, the user discovers and extracts the unknown rule hidden in the data from the tree diagram displayed as a classification result. Finally, in step S6, an outputting process for enabling the classification result to be used by the external application is executed. The outputting process includes an outputting process for converting the unknown rule discovered by the user into a database inquiry conditional expression, an outputting process for converting it into a micro module such as a spreadsheet or the like and allowing it to be used in the online analytical processing system, an outputting process for converting the tree diagram as drawing information into a text in a format which can be used in another application by the user, and an outputting process for editing the unknown rule discovered by the user to a desired format of the user and allowing it to be used by the user.

Figure 13A:
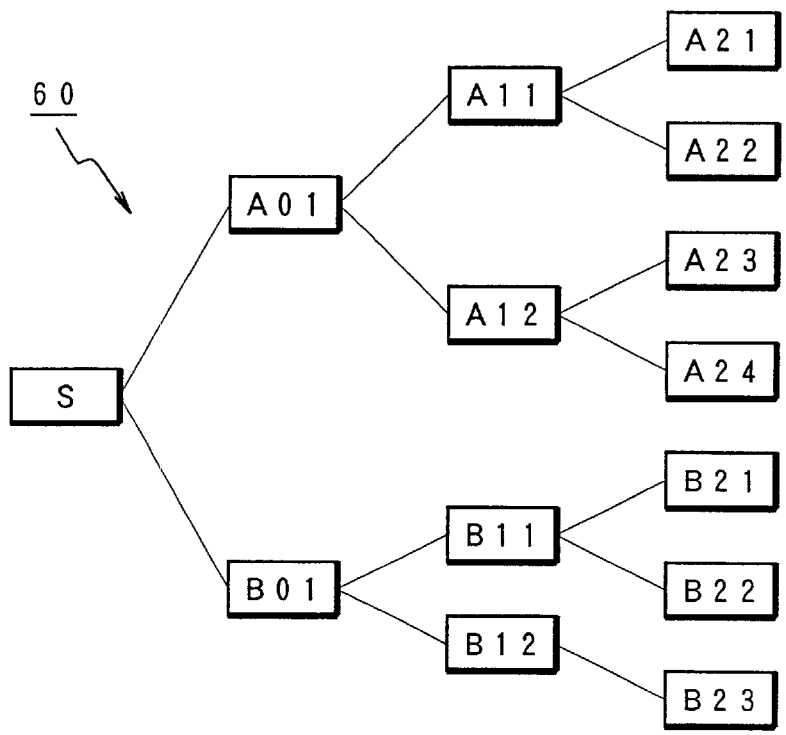
FIGS. 13A and 13B are explanatory diagrams of a folding process in which nodes having no significance are not displayed.
Figure 13B:
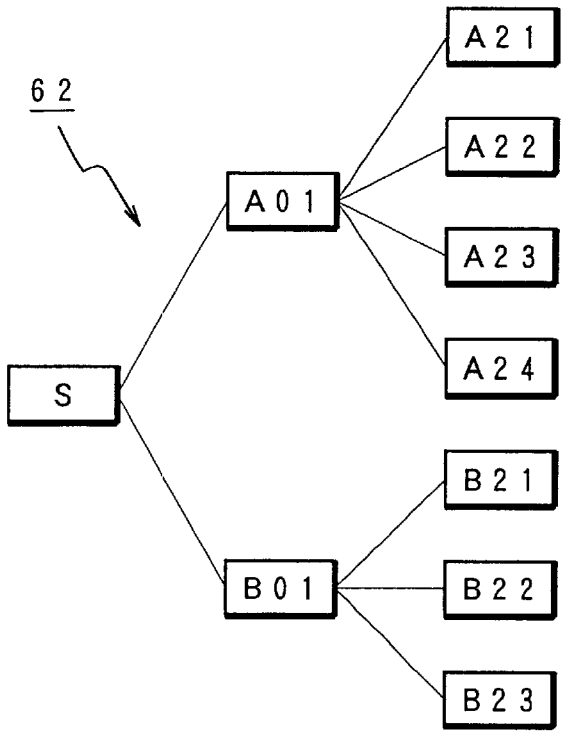

FIGS. 13A and 13B show the first embodiment of the display improving process of the classification result in step S4 in FIG. 12. The first embodiment is characterized in that a tree diagram in which the nodes having no significance are set to a non-display mode is displayed. In the tree diagram 50 as shown in, for example, FIGS. 5A and 5B which is formed by the decision tree algorithm of the classification, the significance of the nodes and leaves is presented as information by the branch trimming which is mechanically performed on the basis of the confidence degree. However, in case of the classification for classifying a plurality of analysis items in the analysis sheet 46 shown in FIG. 3 by the decision tree, the number of nodes and leaves is very large. The user cannot find out the important information by the eyes. According to the invention, therefore, for example, a tree diagram 60 as shown in FIG. 13A obtained as a classification result is converted into a tree diagram 62 as shown in FIG. 13B by the folding process by which the branch conditions for the nodes having no significance, for example, for the nodes A11, A12, B11, and B12 are not displayed, and the relations between the nodes A01 and B01 and the leaves A21 to A24 and B21 to B23 are briefly displayed. As nodes having no significance in the tree diagram 60 of FIG. 13A, for example, as nodes A11, A12, B11, and B12, an $x^2$ inspection value or the like presented as a classification result by the decision tree is referred to. When there is no significance in the branches from the nodes A01 and B01, there is also no significance in the lower nodes A11, A12, B11, and B12 of those nodes. Therefore, in this case, the nodes A11, A12, B11, and B12 having no significance are set to the non-display mode due to the folding process but displayed as shown by the tree diagram 62 of FIG. 13B. By setting the nodes having no significance in the tree diagram as a classification result to the non-display mode due to the folding process as mentioned above, by which rule certain segmented information, namely, the information in which a plurality of analysis items are expressed as condition values has been classified can be easily grasped. It is possible to support the operation such that the user discovers the unknown characteristics included in the mining target data.

FIG. 14 shows the second embodiment for the display improving process of the classification result in step S4 in FIG. 12. The second embodiment is characterized in that by allowing the nodes and leaves in the tree diagram displayed as a classification result according to the algorithm of the decision tree to have changes in shapes, sizes, and colors on the basis of the number of records and the confidence degree which are given as numerical value information with respect to each of them, the nodes with a significance and leaves with a significance in the layer structure of the tree diagram are visually expressed. According to a tree diagram 64, as for items regarding a traffic accident included as attributes in the field of the vehicle record, with respect to the tree diagram of the classification result analyzed by setting the other items associated with them to condition values, the shapes and sizes of the nodes and leaves are changed from the numerical value information. That is, the root (S) is "sex=male" and classified into "age=old/young" in the next nodes A01 and B01. In the leaves A11 and A12 subsequent to the node A01, the number of cases of no-accident is obtained with regard to "district=east/west", respectively. Also with respect to "age=young" in the node B01, in the leaves B11 and B12, the number of cases of no-accident is similarly shown with regard to "district=east/west", respectively. Each condition regarding the leaves A11, A12, B11, and B12 is shown by a polygon. As for a polygon of the leaves, an area of polygon is set to be larger as an appearance degree (the number of records) is larger. The number of strokes (namely, the number of corners) of the polygon is increased as a confidence degree is higher. That is, when the confidence degree is the lowest, the polygon is a triangle. The number of strokes is increased to a quadrangle, a pentagon, and an octagon in accordance with an increase in confidence degree. The polygon is set to a circle when the confidence degree is equal to 100%. As for the display of the significance of the leaves as mentioned above, the whole complicated tree diagram of a deep layer obtained as a classification result is displayed by preview or the like and a polygon showing the significance is displayed with regard to the leaves among them, so that the user visually grasps which condition appears more or which condition has a high confidence degree. Thus, the user intuitively grasps a tendency of the data included in the tree diagram displayed as a classification result and can efficiently extract the hidden rule.

Figure 15:
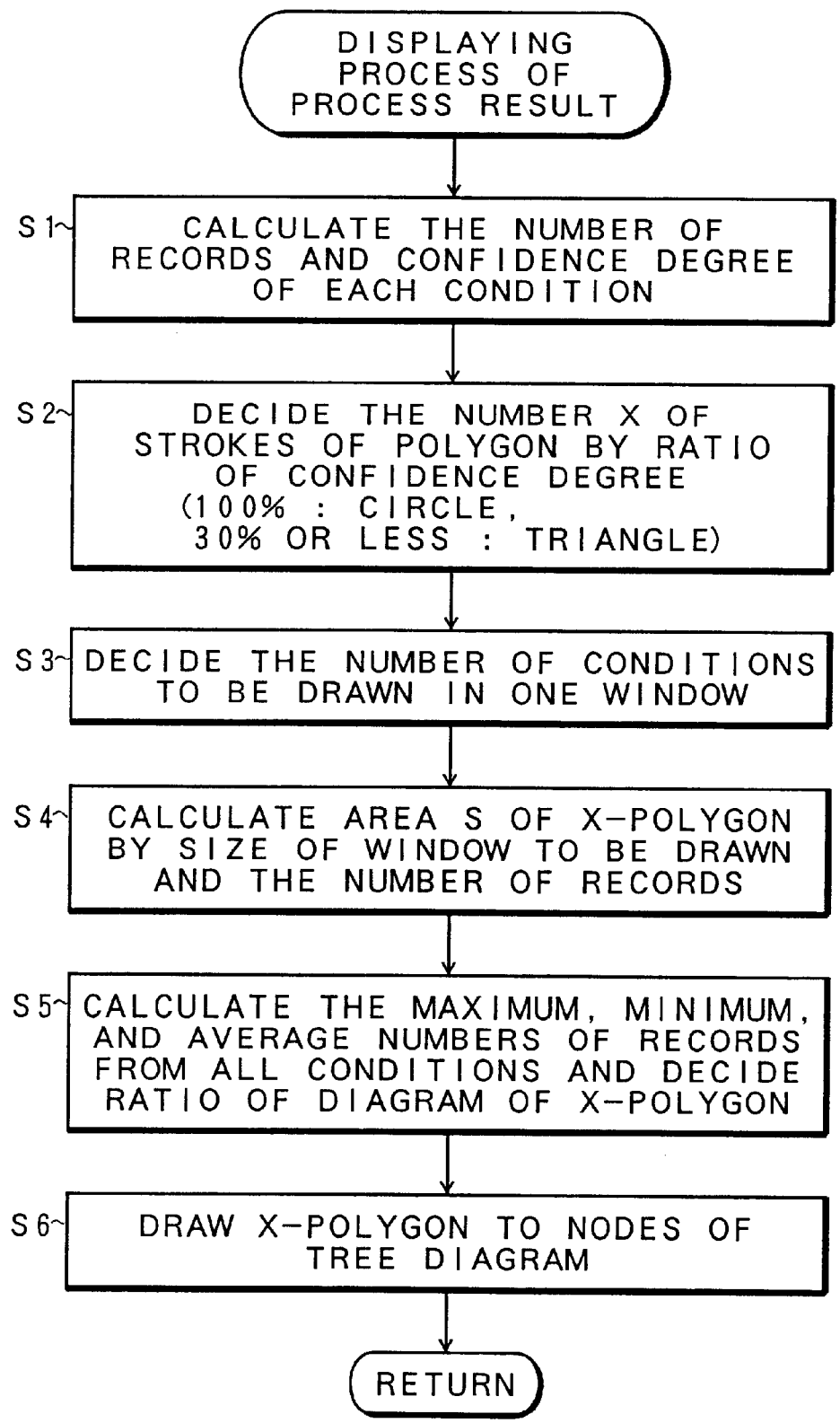
FIG. 15 is a flowchart for a displaying process of a processing result of FIG. 14.

FIG. 15 is a flowchart for the processing result displaying process in FIG. 14. First, in step S1, with regard to the tree diagram obtained as a classification result, the number of records and a confidence degree are calculated every condition. Subsequently, in step S2, the number (X) of strokes of the polygon is calculated on the basis of a ratio of the confidence degree. In this case, the confidence degree of 100% assumes to be a circle and the confidence degree of, for example, 30% or less assumes to be a triangle. In step S3, the number of conditions to be drawn in one window (or one screen) is determined. In step S4, an area (S) of an X-polygon is calculated on the basis of a size of window to be drawn and the number of records.

In step S5, the maximum number of records, the minimum number of records, and the average number of records at the size of window to be drawn are calculated in accordance with all conditions and a ratio of the diagrams of the different kinds of X-polygons is calculated. Finally, in step S6, an X-polygon is drawn at the nodes of the tree diagram, for example, as shown by leaves in FIG. 14.

Figure 16:
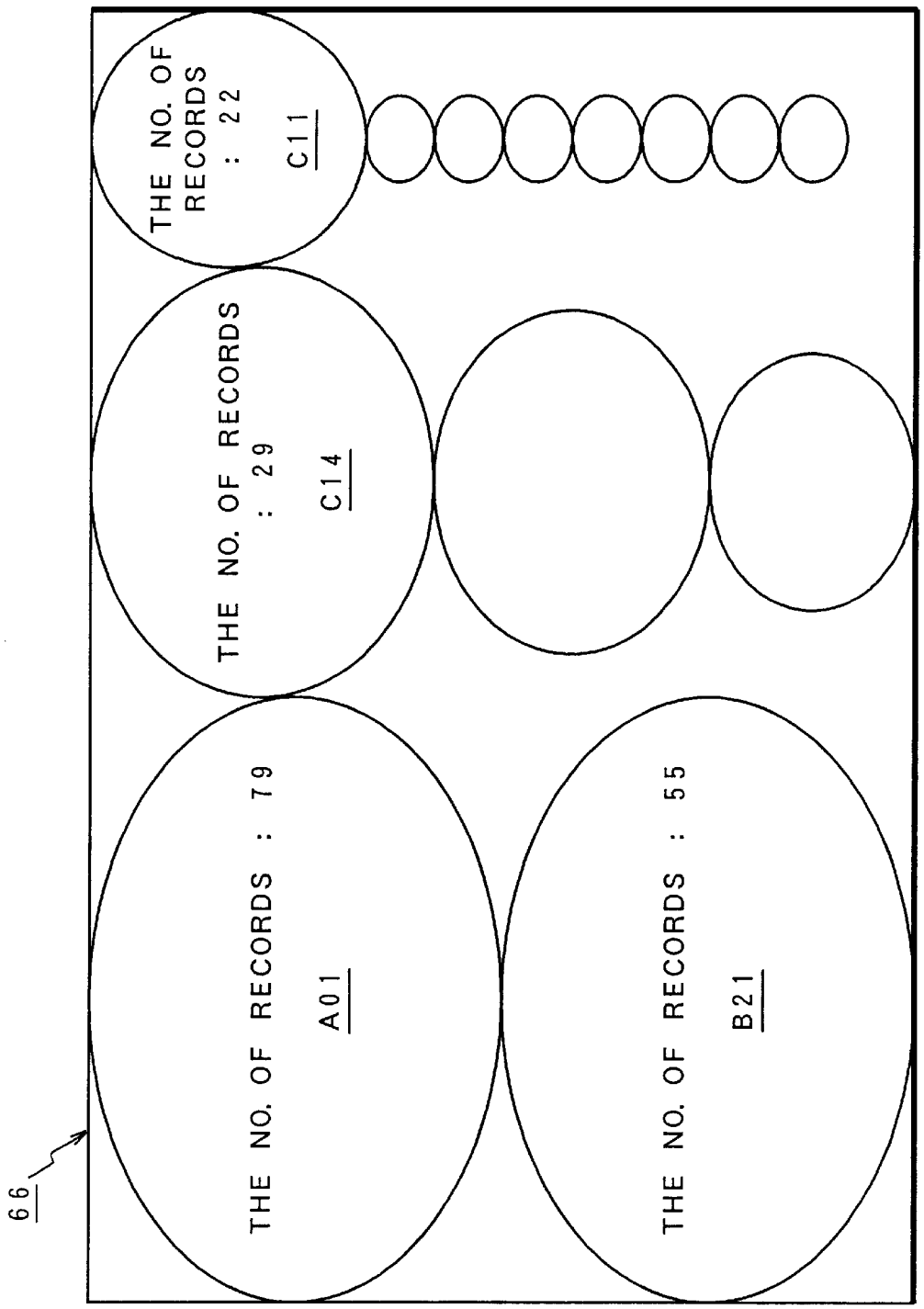
FIG. 16 is an explanatory diagram of a narrowing discrimination diagram in which shapes of nodes having a significance and leaves having a significance which are used for sorting of the tree diagram are expressed by a size according to the number of records.

FIG. 16 shows the third embodiment of the display improving process of the classification result in step S4 in FIG. 12. The third embodiment is characterized in that after the significance of the nodes and leaves which are drawn in the tree diagram as a classification result was discriminated, the tree diagram is sorted on the basis of a discrimination result of the significance. In a significance discrimination diagram 66, the number of records is expressed by a circle with respect to the leaves of the tree diagram obtained as a classification result. That is, as the number of records is larger, the area is increased. As the number of records is smaller, the area is decreased. For example, as nodes having a significance, the leaves A01, B21, C14, and C11 are selected as leaves having a significance in order from the large area.

Figure 17:
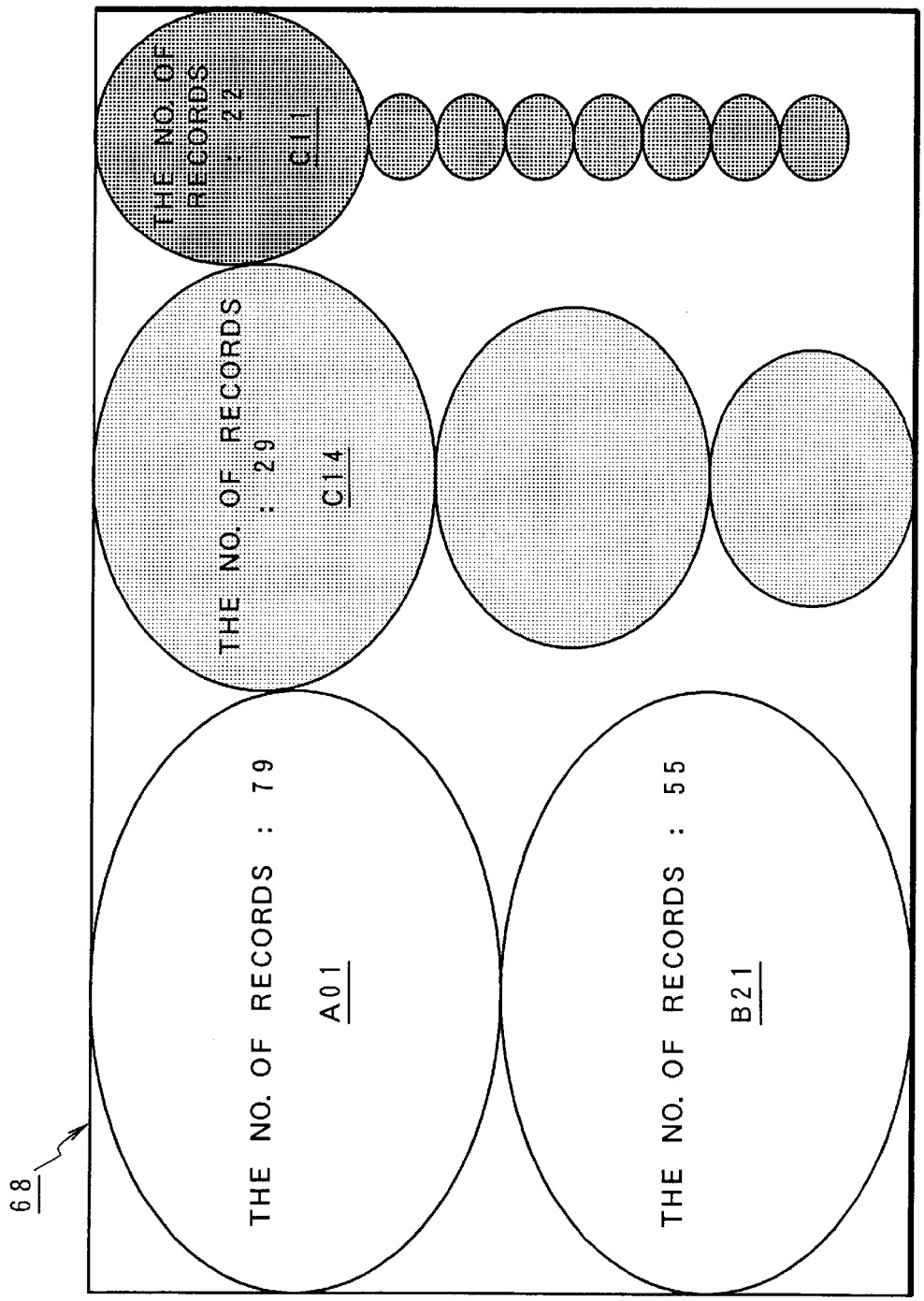
FIG. 17 is an explanatory diagram of a narrowing discrimination diagram in which shapes of the nodes having a significance and leaves having a significance which are used for sorting of the tree diagram are expressed by the size according to the number of records and a density of a color according to a confidence degree.

FIG. 17 shows the significance of the nodes in the tree diagram, namely, the number of records is displayed by an area of a circle and, at the same time, the confidence degree is expressed by a density degree of the color. In this case, as the confidence degree is larger, it is expressed in dense color and as the confidence degree is smaller, it is expressed in light color. In a significance discrimination diagram 68, although the areas based on the number of records increase in order of the leaves C11, C14, A01, and B21, the confidence degrees based on the dense of color decrease in order of the leaves C11, C14, A01, and B21. Also in this case, the leaves A01, B21, C14, and C11 are selected as leaves having a significance.

Figure 18A:
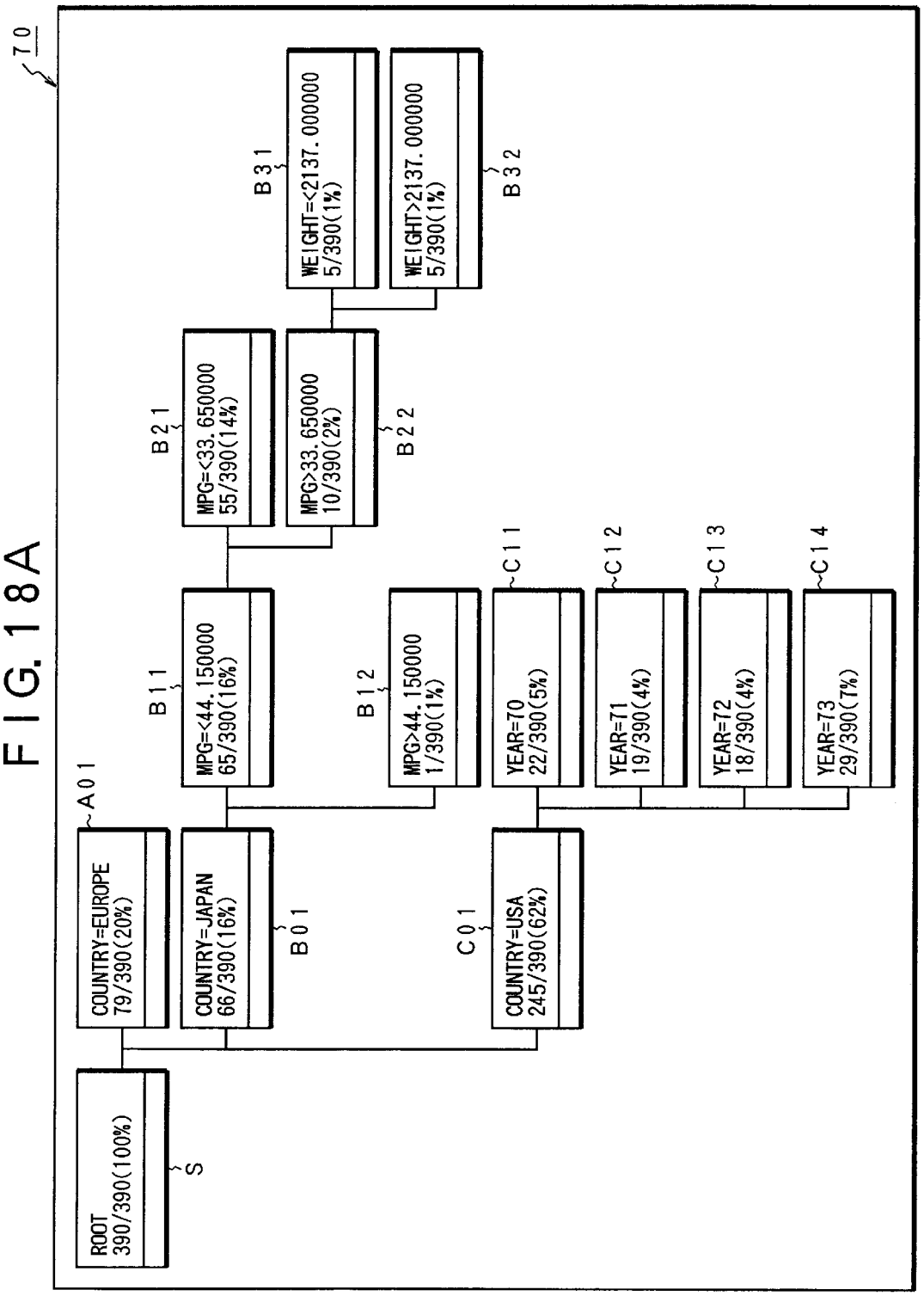
FIGS. 18A and 18B are explanatory diagrams of the tree diagrams which are obtained before and after the sorting using the narrowing discrimination diagrams of FIGS. 16 and 17.
Figure 18B:
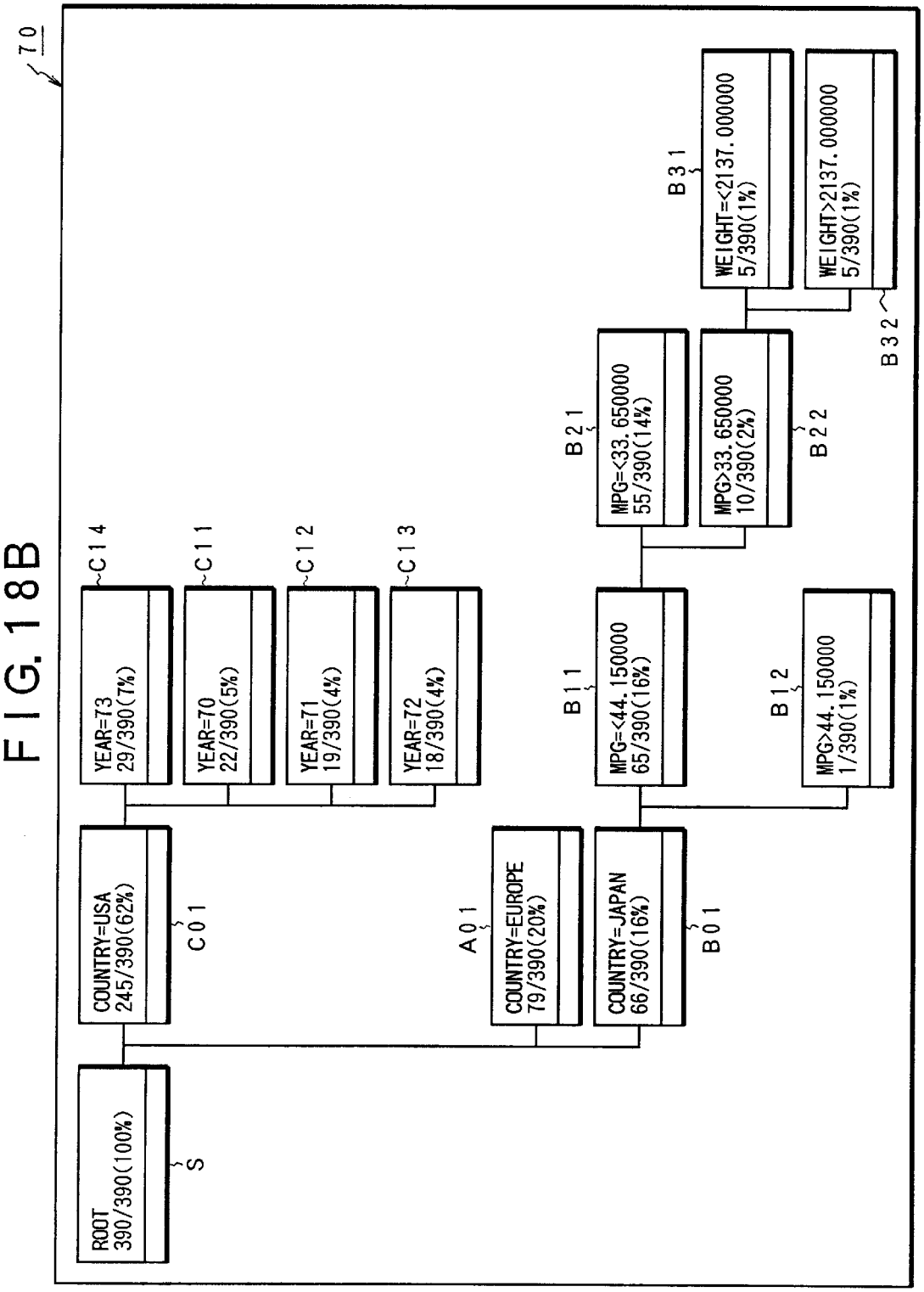

FIG. 18A is a tree diagram 70 which is obtained before the leaves are narrowed down to the leaves C11, C14, A01, and B21 with a significance selected in the significance discrimination diagram 66 of FIG. 16 or the significance discrimination diagram 68 of FIG. 17 and sorted in the ascending order. FIG. 18B is a tree diagram 72 which is obtained after the sorting. In the tree diagram 70 before the sorting, the significance of the leaf is not visually recognized and has to be discriminated by checking the numerical values of the number of records and confidence degree described in the leaf. However, owing to the sorting in the ascending order based on such a significance discrimination diagram, in the tree diagram 72 after the sorting in FIG. 18B, the leaves C11 and C14 having a high significance are moved upward and the leaf B31 having a less significance is moved downward. Thus, the user can grasp the feature of the data by paying attention to the leaves locating upward.

Figure 19:
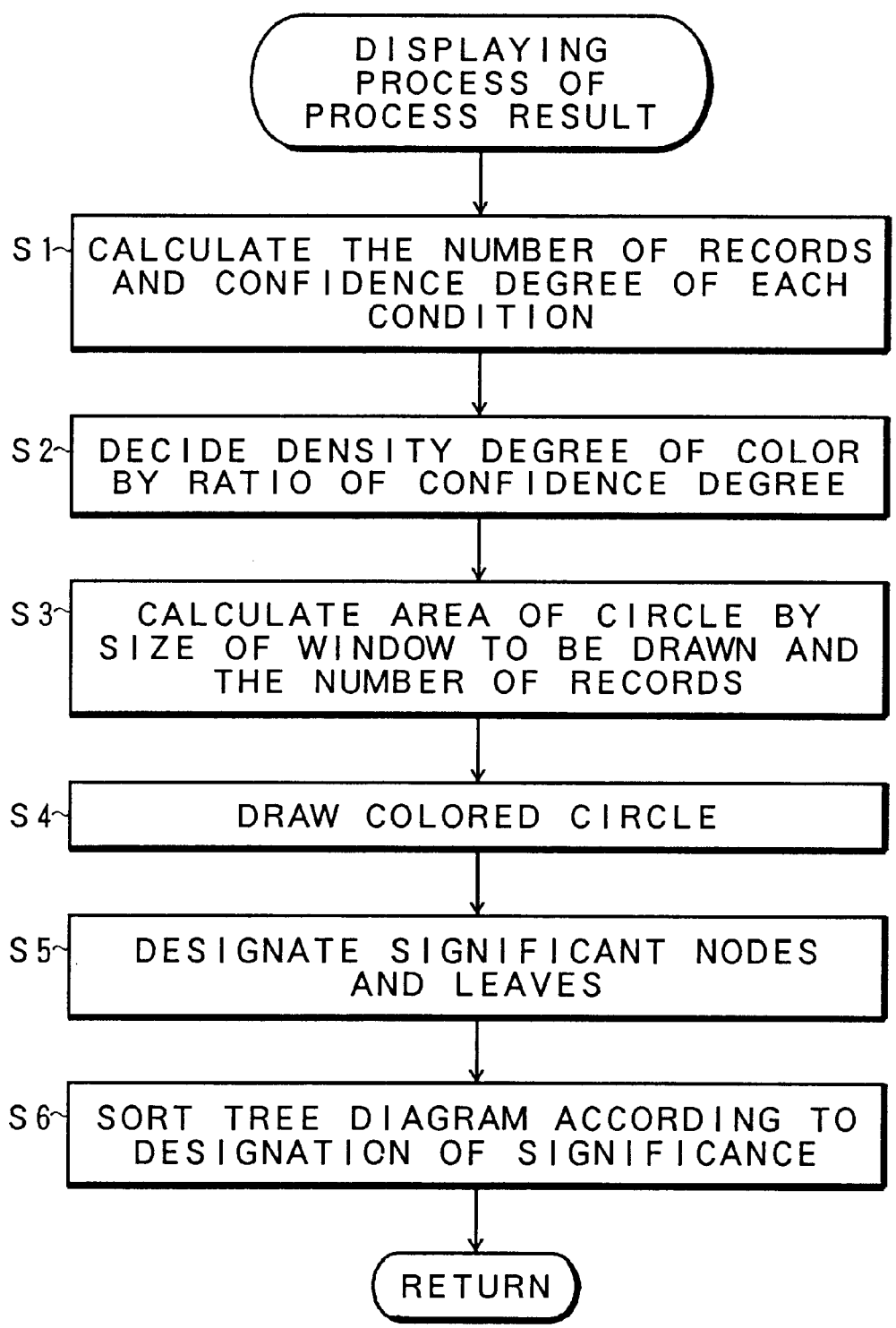
FIG. 19 is a flowchart for a displaying process of a processing result of FIG. 17.

FIG. 19 is a flowchart for a processing result displaying process in the case where the significance is expressed by the area of the circle and the density of the color of the node and the tree diagram is sorted as shown in FIG. 17. In the processing result displaying process, in step S1, the number of records and the confidence degree of each condition are calculated. Subsequently, in step S2, the density of the color is determined by the ratio of the confidence degree. That is, as the confidence degree is higher, the color is made denser and, as the confidence degree is lower, the color is made lighter. In step S3, the area of the circle is calculated on the basis of the size of window to be drawn (or the size of screen) and the number of records. In step S4, a colored circle is drawn and the significance discrimination diagram 68 as shown in FIG. 17 is displayed to the user. When the user designates the nodes and leaves having a significance in order from the high significance in step S5 with reference to this significance discrimination diagram, the tree diagram is sorted in accordance with the designation of the significance on the basis of the designation result in step S6. In FIGS. 18A and 18B, a case of sorting in the ascending order corresponding to the order from the leaf having the higher significance has been described as an example. However, contrarily, they can be also sorted in the descending order corresponding to the order from the leaf having the less significance.

(Outputting Process of the Classification)

The information expressed on the tree diagram obtained as a processing result by the classification processing unit 32 provided in the data mining processing unit 28 in FIGS. 1A and 1B is visually displayed to the user by the visualizer 18. However, according to the invention, in addition to it, the tree diagram and/or the unknown rule extracted from the tree diagram by the user is converted into a format which is used in another application and outputted by the output processing unit 44.

FIGS. 20A to 20C show the first embodiment of the outputting process in step S6 in FIG. 12. The first embodiment is characterized in that the classifying conditions serving as an unknown rule discovered by the user from the tree diagram as a classification result formed by the algorithm of the decision tree are converted into a database extracting condition sentence which includes a relational database and a multidimensional database and can be used on the online analytical processing system 14 side, thereby enabling such a sentence to be used. That is, the above process is the outputting process for forming the rule discovered by the user from the tree diagram obtained as a classification result in the "IF~THEN~" format and converting it into a data extracting condition sentence of various databases. A receiving/transmitting destination of the data extracting condition sentence in the "IF~THEN~" format in this case is set to all of the applications as targets for controlling an SQL sentence, an LODQL sentence, and an MDB command. Each application can obtain a conditional sentence character train in the "IF~THEN~" format from either a dictionary format stored in the file or a program interface (API). That is, FIG. 20A shows a discovery rule 74 extracted by the user from the tree diagram 50 as a classification result in FIGS. 5A and 5B. The discovery rule 74 is expressed in the "IF~THEN~" format as shown in the diagram. As shown in FIG. 20B, a conditional sentence character train 76 which is defined by condition names and conditional expressions is formed from the "IF~THEN~" format of the discovery rule 74. The conditional sentence character train 76 formed as mentioned above is stored in a file format into the analytical dictionary 22 on the online analytical processing system 14 side in FIG. 2 as shown in FIG. 20C and used as a WHERE sentence of an SQL database inquiry sentence 78 to the data warehouse 24. That is, by describing a "WHERE conditional expression" in the SQL database inquiry sentence 78, the conditional sentence character train 76 in FIG. 20B is extracted as a filter which is used for analysis with reference to the analytical dictionary 22. By analyzing the data in the data warehouse 24 by using the conditional expression in the conditional sentence character train 76, the data "record" of the analysis items "year=70" and "year=76" can be searched.

Figure 21:
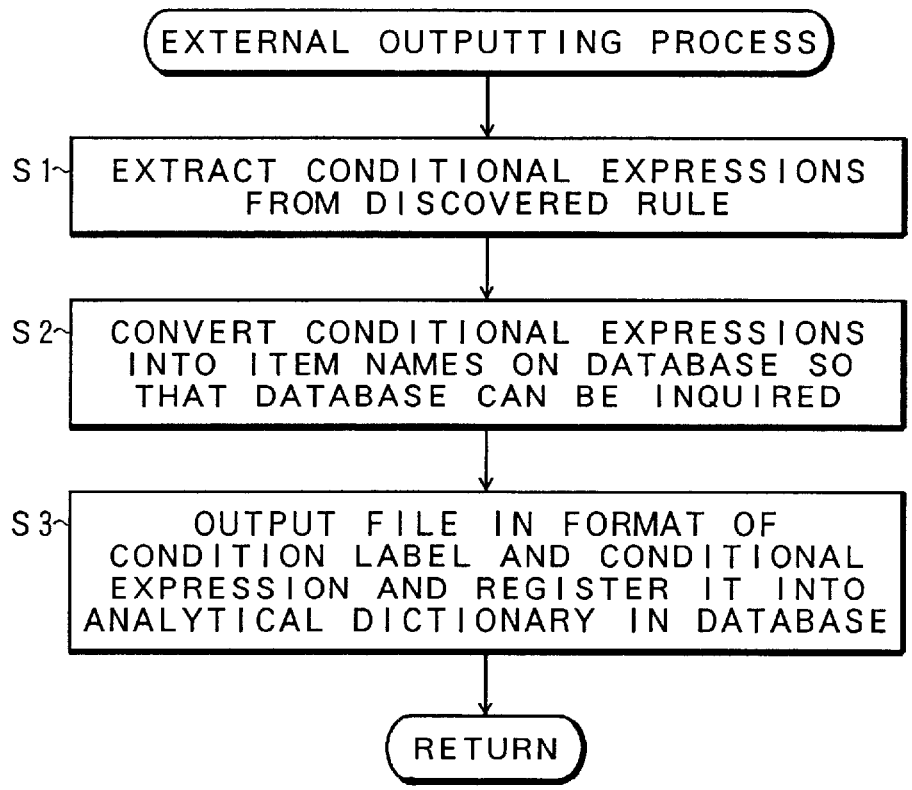
FIG. 21 is a flowchart for the external outputting process of FIGS. 20A to 20C.

FIG. 21 is a flowchart for the external outputting process for converting the database into the conditional sentence character train in FIGS. 20A to 20C. First, in step S1, the conditional expression is extracted from the rule discovered from the tree diagram as a classification result, for example, from the discovery rule 74 in FIG. 20A. In step S2, the conditional expression is converted into the item name on the database so as to make it possible to inquire of the database as shown in the conditional sentence character train 76 in FIG. 20B. Subsequently, in step S3, a file is outputted in the format of a condition label and the conditional expression and registered in the analytical dictionary 22 of the database. The classifying conditions in the discovered rule obtained as a classification result are presented as an extracting conditional sentence to the database, thereby feeding back the result of the data mining process to the online analytical processing system and enabling the analyzing process by the data extraction based on the unknown cut end to be performed. Thus, the rule in which the new item which could not be discovered by the conventional analyzing process is set to the condition can be used for a data analysis or the like such as ranking of the customers who used, selection of the marketing target customers, or the like.

Figure 22:
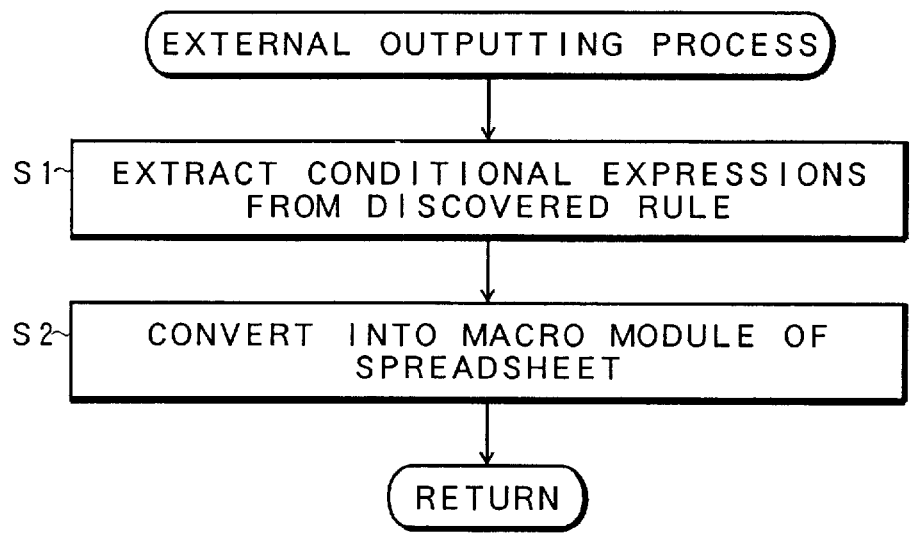
FIG. 22 is a flowchart for an external outputting process in which the data mining result is used for a macro module of a spreadsheet.

FIG. 22 shows the second embodiment of the outputting process of the classification in step S6 in FIG. 12. The second embodiment is characterized in that the conditional sentence of the unknown rule discovered by the user from the classification result is converted into a macro module for extracting data from a spreadsheet such as Excel or the like which is used for forming the analysis sheet 46 processed, for example, on the online analytical processing tool 16 side of the online analytical processing system 14 in FIGS. 2A and 2B. In the external outputting process, first, in step S1, for example, in a manner similar to FIG. 20A, since the conditional sentence "IF~THEN~" is included in the unknown discovery rule 74 discovered by the user from the tree diagram side obtained as a classification result, the conditional expression is extracted from the rule 74. In step S2, the conditional expression extracted from the discovery rule as mentioned above is converted into the macro module of the spreadsheet such as Excel or the like and registered in, for example, the online analytical processing tool 16 in FIGS. 2A and 2B.

FIGS. 23A and 23B show a narrowing process of data of an Excel sheet using the conditional expression as a classification result registered as a macro module of the spreadsheet by the external outputting process in FIG. 22. FIG. 23A shows an Excel sheet 82 which is obtained before the narrowing. The macro module in which the conditional expression of the rule discovered from the classification result has been registered is applied to the Excel sheet 82 before narrowing, so that Excel data can be narrowed down by applying the rule of the classification result as shown by, for example, an Excel sheet 84 which is obtained after the narrowing in FIG. 23B. By converting the conditional expression of the unknown rule obtained from the classification result into the macro module which is used for data extraction from the spreadsheet such as Excel or the like as mentioned above, the simplified data extraction on the personal computer on the basis of the unknown cut end can be realized. Therefore, for example, when a specific customer is selected from the customer information, the unknown cut end based on the conditional expression discovered by the data mining can be used.

Figure 24:
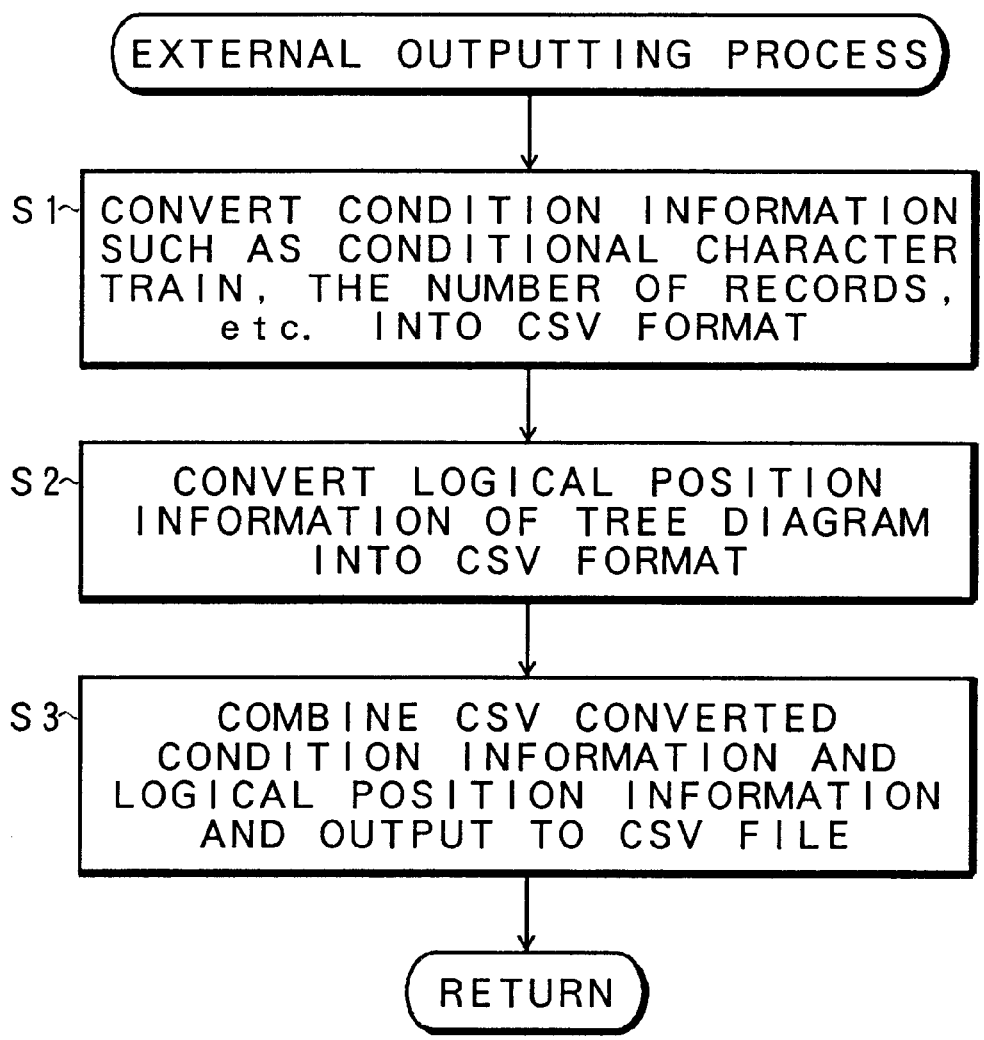
FIG. 24 is a flowchart for an external outputting process in which the tree diagram obtained as a classification result is converted into a text in a CSV format.

FIG. 24 shows the third embodiment of the outputting process of the classification result in step S6 in FIG. 12. The third embodiment is characterized in that the tree diagram which is displayed as a classification result is converted into a text so that it can be expressed on another application. That is, in the third embodiment, drawing information converted into a text for drawing the tree diagram which is displayed as a classification result is formed, thereby realizing a function of a file interface such that it can be transmitted and received to/from the other application. That is, in the external outputting process as a third embodiment, first, in step S1, for example, as shown in FIGS. 5A and 5B, condition information such as conditional sentence character train which starts from the root and reaches the leaf through the node, the number of records, and the like is converted into, for example, a CSV format on the basis of the tree diagram 50 obtained as a classification result. "CSV" is an abbreviation of Comma Separated Value and is one of data formats having a data format such that the record and the other record are separated by a line feed code and the fields of the record are separated by a comma code. Subsequently, in step S2, logical position information which starts from the root and reaches the leaf through the node with regard to the tree diagram is similarly converted into the CSV format. Finally, in step S3, the condition information and logical position information converted into the CSV format are together outputted to the CSV file. Therefore, although there was merely a method whereby the tree diagram obtained as a classification result is used only for a hard copy hitherto, according to the invention, it can be provided as drawing information converted into the text to the outside. An ISV product or a drawing process of the tree diagram which is peculiar to the user can be formed by another application by using the CSV file. Thus, the tree diagram obtained by the data mining apparatus of the invention can be used for development of another product in which the mining engine of the decision tree has been assembled. The use width of the data mining result is widened.

Figure 25:
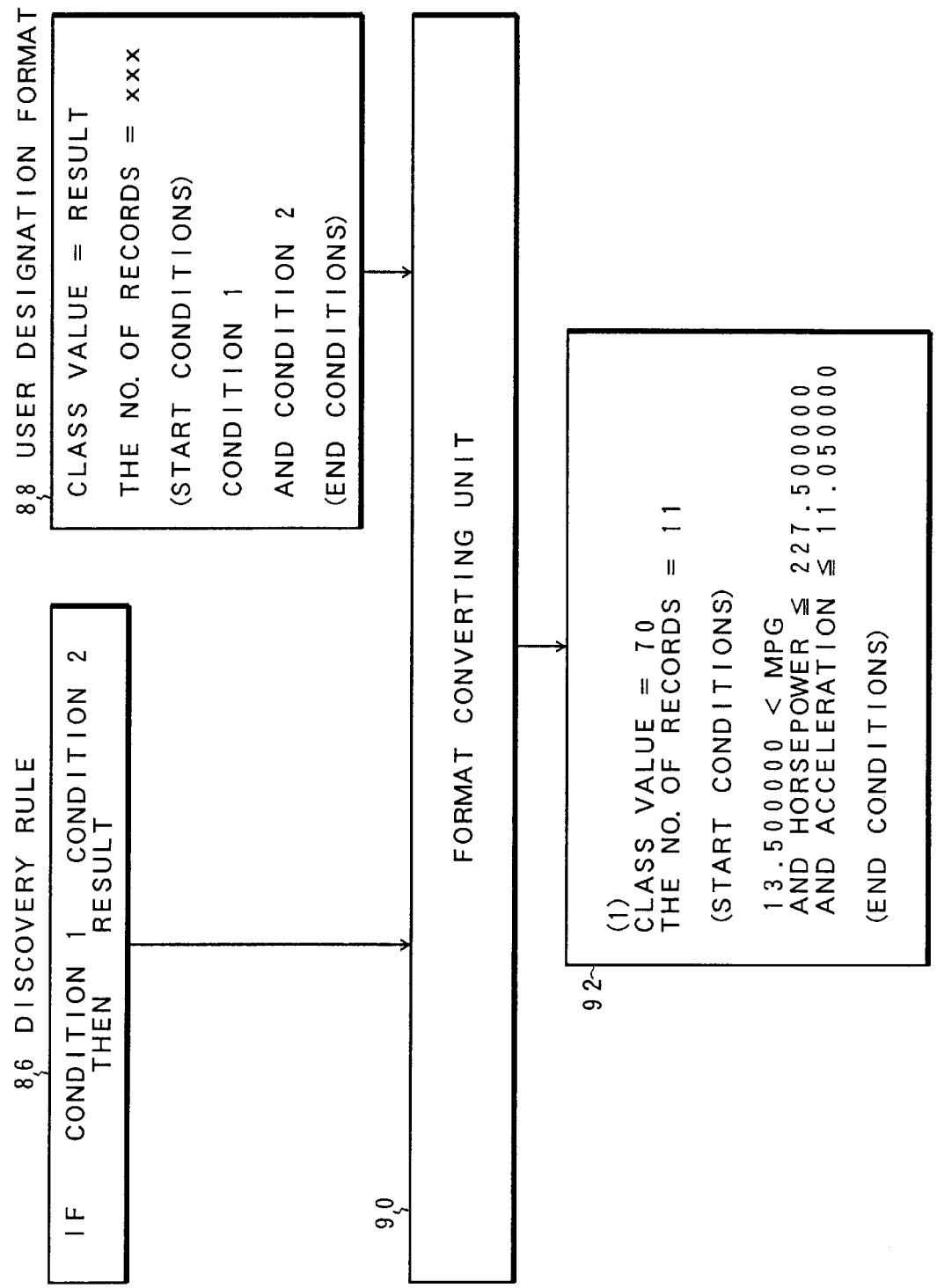
FIG. 25 is an explanatory diagram of an outputting process in which the rule in an "IF~THEN~" format of the data mining result is converted into a file format which can be edited and modified by the user.

FIG. 25 shows the fourth embodiment of the outputting process of the classification result in step S6 in FIG. 12. The fourth embodiment is characterized in that the display result in the "IF~THEN~" format discovered by the user from the tree diagram obtained as a classification result is converted into a desired format of the user and outputted. Thus, it is possible to provide a function as an interface in which the rule in the "IF~THEN~" format discovered from the tree diagram obtained as a classification result can be customized to a desired format of the user and displayed. That is, in the fourth embodiment of the outputting process, a discovery rule 86 discovered from the tree diagram as a classification result is inputted in, for example, a format of "IF condition 1 condition 2 THEN result" to a format converting unit 90 for converting the rule into a desired format of the user. On the other hand, a user designation format 88 which is desired by the user is set into the format converting unit 90. Therefore, the format converting unit 90 edits the user designation format 88 by the discovery rule 86 inputted as a classification result and forms edition data 92 after the format conversion. Assuming that "IF MPG>13.5 Horsepower≦227.5 and Acceleration≦11.05 THEN Year=70" shown on the first line of the discovery rule 74 in FIG. 20A is inputted as a discovery rule 86, a class value 70 and the number of records=11 are stored in the edition data 92. "13.5<MPG and Horsepower≦227.5 and Acceleration≦11.05" are stored as (starting conditions).

Figure 26:
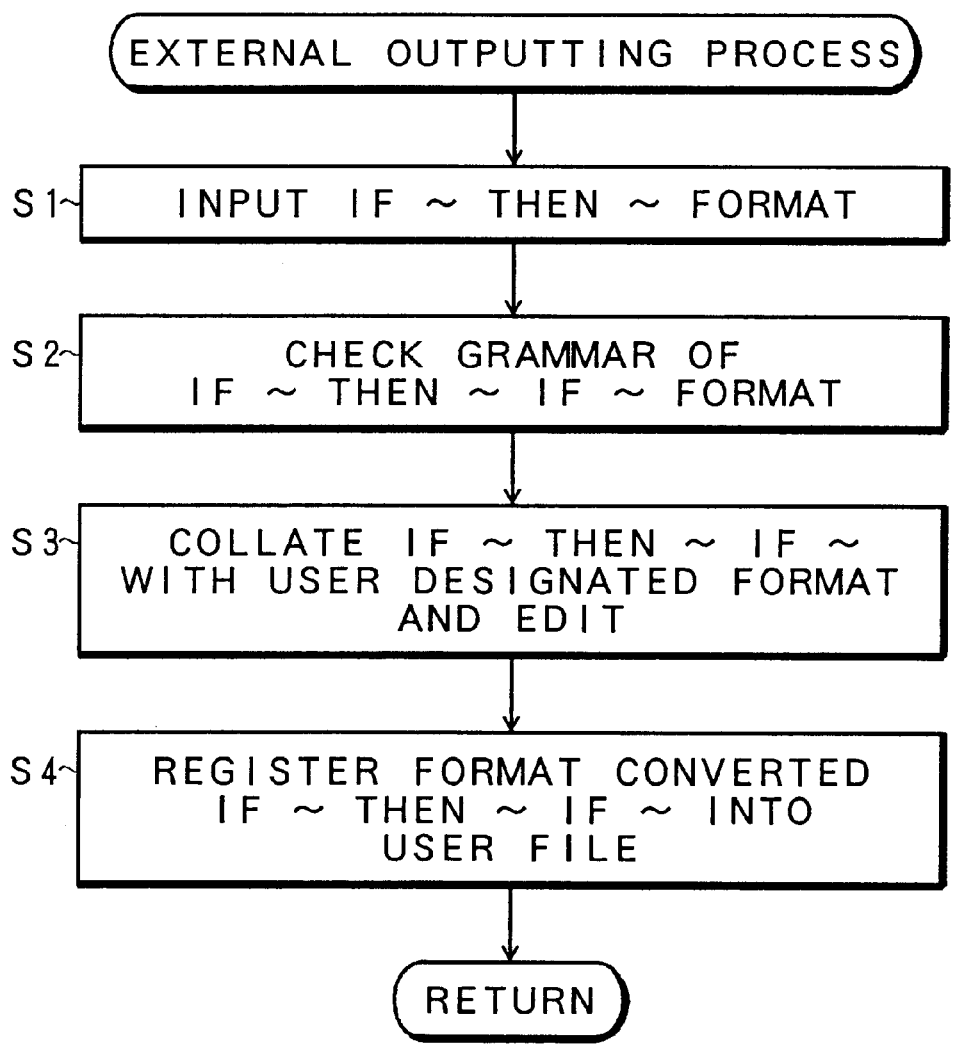
FIG. 26 is a flowchart for the external outputting process of FIG. 25.

FIG. 26 is a flowchart for the external outputting process for editing into a desired format of the user in FIG. 25. First, a discovery rule of the "IF~THEN~" format is inputted in step S1. In next step S2, grammar of the "IF~THEN~" format is checked. Subsequently, in step S3, "IF~THEN~" is collated with the format designated by the user and edited. In step S4, the edited "IF~THEN~" format is registered into the user file. As mentioned above, by performing the customization for editing the rule in the "IF~THEN~" format discovered by the user from the tree diagram as a classification result into the desired format of the user, the result of the data mining can be fed back to the application on the user side and used for management of the business data or the like.

A computer-readable storage medium which stores the data mining processing program according to the invention will now be described.

The data mining processing program of the invention is constructed by the clustering processing unit 30 and classification processing unit 32 provided for the data mining processing unit 28 in FIGS. 1A and 1B. The clustering processing unit 30 includes the functions of the division number designating unit 34, narrowing condition designating unit 36, and display processing unit 38. The classification processing unit 32 includes the functions of the narrowing condition designating unit 40, display processing unit 42, and output processing unit 44. The details of each processing unit are as shown in the embodiments in FIGS. 1A to 26. Such a data mining processing program of the invention is stored into a portable storage medium such as CD-ROM, floppy disk, DVD magnetooptic disk, IC card, or the like or installed from a database or another computer system by using a modem or LAN interface. The information mediating program of the invention installed as mentioned above is inputted to the computer system and executed as, for example, a mediator server. The information mediating program of the invention which is installed into the computer is stored to a hard disk HDD and executed by a CPU by using an RAM or the like.

As mentioned above, according to the data mining apparatus of the invention, the following effects can be obtained.
(Simultaneous Display of the Classification Result of Clustering and the Division Number)

According to the data mining apparatus of the invention, by simultaneously displaying a plurality of processing results of the clustering every division number in a range from the 2-division to an arbitrary division number, whether the division number of the clustering is proper or not can be discriminated. That is, by simultaneously displaying the classification display and division display of the classification results of a plurality of division numbers onto the parallel coordinate graph, in the case where the division number increases, from which one of the divided groups the division group has been originated to a plurality of analysis items can be clearly recognized. Thus, the user can easily discover the proper division number.

A situation of the grouping based on the classification results of a plurality of division numbers is displayed by the annual ring diagram. The data distance between the groups at each division number is displayed by the width (thickness) of annual ring. Therefore, the user can easily determine that the division number of the largest width is the proper division number.
(Node Folding Process of the Classification Result)

According to the data mining apparatus of the invention, with regard to the tree diagram formed as a classification result, by setting the nodes according to the unnecessary branching conditions in it to the non-display state, the relation between the nodes and the leaves can be displayed simply. Thus, the user can easily grasp by which rule certain itemized data has been classified. The decision of the user who discovers the hidden rule from the classification result such as customer information or the like can be strongly supported.
(Narrowing Conditions of Data Mining)

The user designates and narrows down the range of the data which is handled in the data mining of the invention, so that even in case of a large amount of data, the analyzing process such as clustering, classification, or the like can be performed with respect to the narrowed range. Only the analysis result corresponding to the necessary narrowing condition can be taken out from those processing results. Therefore, the rule having the significance can be more easily extracted.
(Display Improvement of the Tree Diagram)

Although the numerical value information obtained s an analysis result is displayed in the nodes and leaves of the tree diagram which is formed as a classification result, the tendency of the data can be more intuitively grasped by changing the numerical value information of the nodes and leaves, for example, the number of records and the confidence degree in accordance with the sizes, shapes, and colors of the nodes and leaves.
(Sorting of the Tree Diagram)

With respect to the tree diagram of the classification result, the significance of the nodes and leaves is discriminated by changing the sizes, shapes, and colors and the sorting for narrowing down the nodes and leaves of the tree diagram is performed on the basis of the discrimination result of the significance. Thus, the tree diagram can be more easily seen by performing the sorting or narrowing for summarizing the data belonging to a similar classification without allowing the user to verify the $x^2$ inspection value or the like of the conditional sentence which is displayed as character information to the nodes and leaves.
(Outputting Process to the Database Inquiry Conditions)

According to the data mining apparatus of the invention, the conditional expression of the rule discovered by the user from the tree diagram obtained as a classification result is converted and outputted as a conditional expression of the database inquiry to the database, so that the data analysis at the cut end by the unknown rule discovered from the classification result can be performed. It can be used for data analysis such as ranking of the customers, selection of the marketing target customers, or the like using the rule in which the new analysis item which could not be discovered so far is set to the condition.
(Outputting Process of the Macro for the Spreadsheet)

According to the data mining apparatus of the invention, the conditional sentence in the "IF~THEN~" format of the rule discovered from the tree diagram obtained as a classification result is converted into the macro module which is used for extracting the data from the spreadsheet such as Excel or the like and outputted, thereby enabling the simple data extracting process of the information of the personal computer due to the unknown cut end to be performed. Thus, the cut end based on the unknown rule discovered by the data mining is provided as a macro module to the user and the result of the data mining can be used for the data extraction from the spreadsheet.

(Text Conversion of the Tree Diagram)

According to the data mining apparatus of the invention, the tree diagram which is obtained as a classification result is outputted as drawing information converted into the text, so that ISV product or the tree diagram that is peculiar to the user can be drawn. Thus, the data mining result of the invention can be used for development of another product in which the mining engine of the algorithm of a similar decision tree has been assembled.

(Customization of the Extraction Rule)

According to the data mining apparatus of the invention, the rule in the "IF~THEN~" format discovered from the tree diagram of the classification result is customized to the desired format of the user, so that the data mining result is fed back to another application of the user and can be used for, for example, the management or the like of the business data.

The data mining apparatus of the invention is not limited to the foregoing embodiments but incorporates many proper modifications without losing the advantages and purposes of the invention. The invention is not limited by the numerical values shown in the above embodiments.

What is claimed is:

1. A data mining apparatus for discovering an unknown rule included in a data group, comprising:
   a division number designating unit for designating a range of a division number in a range from 2-division to an arbitrary designated division number (N);
   a clustering processing unit for classifying data having similar characteristics into a plurality of clusters (layers) every division number in the range from 2-division to said designated division number (N) with regard to the data group having a plurality of analysis items as targets; and
   a display processing unit for simultaneously displaying a plurality of processing results obtained by said clustering processing unit.

2. An apparatus according to claim 1, wherein said display processing unit displays a parallel coordinate graph obtained as a polygonal line by plotting a classification result of each analysis item based on said designated division number (N) onto an axis of each analysis item, arranges dividing axes in the range from 2-division to said designated division number, and simultaneously displays a transition of the division and a connection between the classification results by a polygonal line.

3. An apparatus according to claim 1, wherein said display processing unit converts classification results in the range from 2-division to said designated division number (N) into an annual ring diagram and displays it.

4. A data mining apparatus for discovering an unknown rule included in a data group, comprising:
   a classification processing unit for forming characteristics of a specific analysis item among a plurality of analysis items with respect to a data group having said plurality of analysis items as targets by predicting an unknown rule in which the other analysis items are expressed as condition values; and
   a display processing unit for, when a formation result of said classification processing unit is expressed and displayed by a tree diagram, converting said tree diagram into a tree diagram in which nodes having no significance are set into a non-display mode and displaying it.

5. A data mining apparatus for discovering an unknown rule included in a data group, comprising:
   a clustering processing unit for designating an arbitrary division number with regard to the data group having a plurality of analysis items as targets, classifying data having similar characteristics into clusters (layers) of said division number, and displaying a classification result;
   a classification processing unit for forming characteristics of a specific analysis item among said plurality of analysis items with respect to said data group having said plurality of analysis items as targets by predicting an unknown rule in which the other analysis items are expressed as condition values; and
   a narrowing condition designating unit for narrowing down a range of the data which is handled by said clustering processing unit and said classification processing unit by a user designation.

6. A data mining apparatus for discovering an unknown rule included in a data group, comprising:
   a classification processing unit for forming characteristics of a specific analysis item among a plurality of analysis items with respect to a data group having said plurality of analysis items as targets by predicting an unknown rule in which the other analysis items are expressed as condition values; and
   a display processing unit for, when a formation result of said classification processing unit is expressed and displayed by a tree diagram, allowing shapes, colors, and/or sizes of nodes and leaves to have changes based on a plurality of attributes.

7. A data mining apparatus for discovering an unknown rule included in a data group, comprising:
   a classification processing unit for forming characteristics of a specific analysis item among a plurality of analysis items with respect to a data group having said plurality of analysis items as targets by predicting an unknown rule in which the other analysis items are expressed as condition values; and
   a display processing unit for, when a formation result of said classification processing unit is expressed and displayed by a tree diagram, evaluating significance of nodes and leaves, sorting said tree diagram on the basis of said significance, and displaying said tree diagram.

8. A data mining apparatus for discovering an unknown rule included in a data group, comprising:
   a classification processing unit for forming characteristics of a specific analysis item among a plurality of analysis items with respect to a data group having said plurality of analysis items as targets by predicting an unknown rule in which the other analysis items are expressed as condition values; and
   an output processing unit for converting a processing result of said classification processing unit into a format which can be used outside and outputting it.

9. An apparatus according to claim 8, wherein said output processing unit converts a specific rule extracted from the result of said classification processing unit into a conditional expression and outputs it to the outside.

10. An apparatus according to claim 8, wherein said output processing unit converts said predicted rule into a macro module of a spreadsheet and outputs it.

11. An apparatus according to claim 8, wherein said output processing unit converts a tree diagram obtained by said classification processing unit into drawing information which can be drawn by an external application and outputs it.

12. An apparatus according to claim 8, wherein said output processing unit converts a rule in an "IF~THEN~" format extracted from the processing result of said classification processing unit into a format designated by the user and outputs it.

13. A computer-readable storage medium which stores a data mining processing program for discovering an unknown rule included in a data group, wherein said data mining processing program comprises:
  a division number designating step of designating a range of a division number in a range from 2-division to an arbitrary designated division number (N);
  a clustering processing step of classifying data having similar characteristics into a plurality of clusters (layers) every division number in the range from 2-division to said designated division number (N) with regard to the data group having a plurality of analysis items as targets; and
  a display processing step of simultaneously displaying a plurality of processing results obtained by said clustering processing step.

14. A medium according to claim 13, wherein in said display processing step, a parallel coordinate graph obtained as a polygonal line by plotting a classification result of each analysis item based on said designated division number (N) onto an axis of each analysis item is displayed, dividing axes in the range from 2-division to said designated division number are arranged, and a transition of the division and a connection between the classification results are simultaneously displayed by a polygonal line.

15. A medium according to claim 13, wherein in said display processing step, classification results in the range from 2-division to said designated division number (N) are converted into an annual ring diagram and displayed.

16. A computer-readable storage medium which stores a data mining processing program for discovering an unknown rule included in a data group, wherein said data mining processing program comprises:
  a classification processing step of forming characteristics of a specific analysis item among a plurality of analysis items with respect to a data group having said plurality of analysis items as targets by predicting an unknown rule in which the other analysis items are expressed as condition values; and
  a display processing step of, when a formation result in said classification processing step is expressed and displayed by a tree diagram, converting said tree diagram into a tree diagram in which nodes having no significance are set into a non-display mode and displaying it.

17. A computer-readable storage medium which stores a data mining processing program for discovering an unknown rule included in a data group, wherein said data mining processing program comprises:
  a clustering processing step of designating an arbitrary division number with regard to the data group having a plurality of analysis items as targets, classifying data having similar characteristics into clusters (layers) of said division number, and displaying a classification result;
  a classification processing step of forming characteristics of a specific analysis item among said plurality of analysis items with respect to said data group having said plurality of analysis items as targets by predicting an unknown rule in which the other analysis items are expressed as condition values; and
  a narrowing condition designating step of narrowing down a range of the data which is handled in said clustering processing step and said classification processing step by a user designation.

18. A medium according to claim 17, wherein in said narrowing condition designating step, a range of the number of records in said target data group, a range of each analysis item value, and the like in said clustering processing step are narrowed down by a user designation, and a range of the number of layers, a range of the number of records of the target data, a range of each analysis item value, and the like in said classification processing step are narrowed down by a user designation.

19. A computer-readable storage medium which stores a data mining processing program for discovering an unknown rule included in a data group, wherein said data mining processing program comprises:
  a classification processing step of forming characteristics of a specific analysis item among a plurality of analysis items with respect to a data group having said plurality of analysis items as targets by predicting an unknown rule in which the other analysis items are expressed as condition values; and
  a display processing step of, when a formation result in said classification processing step is expressed and displayed by a tree diagram, allowing shapes, colors, and/or sizes of nodes and leaves to have changes based on a plurality of attributes.

20. A medium according to claim 19, wherein in said display processing step, diagrams, colors, and/or sizes expressing said nodes and leaves are changed by setting the number of records and a confidence degree to attributes.

21. A computer-readable storage medium which stores a data mining processing program for discovering an unknown rule included in a data group, wherein said data mining processing program comprises:
  a classification processing step of forming characteristics of a specific analysis item among a plurality of analysis items with respect to a data group having said plurality of analysis items as targets by predicting an unknown rule in which the other analysis items are expressed as condition values; and
  a display processing step of, when a formation result in said classification processing step is expressed and displayed by a tree diagram, evaluating significance of nodes and leaves, sorting said tree diagram on the basis of said significance, and displaying said tree diagram.

22. A computer-readable storage medium which stores a data mining processing program for discovering an unknown rule included in a data group, wherein said data mining processing program comprises:
  a classification processing step of forming characteristics of a specific analysis item among a plurality of analysis items with respect to a data group having said plurality of analysis items as targets by predicting an unknown rule in which the other analysis items are expressed as condition values; and
  an output processing step of converting a processing result in said classification processing step into a format which can be used outside and outputting it.

23. A medium according to claim 22, wherein in said output processing step, a specific rule extracted from the result in said classification processing step is converted into a conditional expression and outputted to an outside.

24. A medium according to claim 22, wherein in said output processing step, said predicted rule is converted into a macro module of a spreadsheet and outputted.

25. A medium according to claim 22, wherein in said output processing step, a tree diagram obtained in said classification processing step is converted into drawing information which can be drawn by an external application and outputted.

26. A medium according to claim 22, wherein in said output processing step, a rule in an "IF~THEN~" format extracted from the processing result in said classification processing step is converted into a format designated by the user and outputted.

* * * * *